US012696349B2

(12) United States Patent
Jang et al.

(10) Patent No.: US 12,696,349 B2
(45) Date of Patent: Jul. 28, 2026

(54) METHOD AND DEVICE FOR IDENTIFYING LOST STATE OF ELECTRONIC DEVICE

(71) Applicant: Samsung Electronics Co., Ltd., Gyeonggi-do (KR)

(72) Inventors: Wonkyoung Jang, Gyeonggi-do (KR); Doosuk Kang, Gyeonggi-do (KR); Sangchul Yun, Gyeonggi-do (KR); Gyujin Lee, Gyeonggi-do (KR); Jubyung Lee, Gyeonggi-do (KR); Junwan Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 497 days.

(21) Appl. No.: 18/131,119

(22) Filed: Apr. 5, 2023

(65) Prior Publication Data

US 2023/0239963 A1     Jul. 27, 2023

Related U.S. Application Data

(63) Continuation of application No. PCT/KR2022/004047, filed on Mar. 23, 2022.

(30) Foreign Application Priority Data

Mar. 25, 2021     (KR) ........................ 10-2021-0038886

(51) Int. Cl.
*H04W 76/34* (2018.01)
*H04W 52/14* (2009.01)
*H04W 76/19* (2018.01)

(52) U.S. Cl.
CPC ......... *H04W 76/34* (2018.02); *H04W 52/146* (2013.01); *H04W 76/19* (2018.02)

(58) Field of Classification Search
CPC ... H04W 76/34; H04W 52/146; H04W 76/19; H04W 92/18; H04W 4/02; H04W 88/02; H04W 8/22; H04W 4/023; H04W 76/30
See application file for complete search history.

(56) References Cited

U.S. PATENT DOCUMENTS

| | | |
|---|---|---|
| 2011/0148625 A1 | 6/2011 | Velusamy |
| 2016/0249168 A1 | 8/2016 | Evans et al. |

(Continued)

FOREIGN PATENT DOCUMENTS

| | | |
|---|---|---|
| CN | 112653960 | 4/2021 |
| KR | 1020100134297 | 12/2010 |

(Continued)

OTHER PUBLICATIONS

PCT/ISA/210 Search Report issued on PCT/KR2022/004047, Jul. 15, 2022, pp. 5.

(Continued)

*Primary Examiner* — Mohammad S Adhami
*Assistant Examiner* — Samuel Dilan Rutnam
(74) *Attorney, Agent, or Firm* — The Farrell Law Firm, P.C.

(57) ABSTRACT

Disclosed is an electronic device including a wireless communication circuit configured to support communication connections to one or multiple devices, at least one processor, and a memory which stores instructions causing, when executed, the at least one processor to identify whether a first communication connection to a second external device through the wireless communication circuit is disconnected, acquire, if disconnection of the first communication connection is identified, communication state information from a first external device connected through the wireless communication circuit, identify, based on the acquired communication state information, whether a second communication connection between the first external device and the second external device is disconnected, and operate in a loss occurrence mode for the second external device if disconnection of the second communication connection is identified.

20 Claims, 14 Drawing Sheets

(56) References Cited

U.S. PATENT DOCUMENTS

| | | | |
|---|---|---|---|
| 2017/0078837 A1 | 3/2017 | Liang et al. | |
| 2017/0325059 A1 | 11/2017 | de la Broise | |
| 2017/0352250 A1 | 12/2017 | de Barros Chapiewski et al. | |
| 2018/0014106 A1* | 1/2018 | Jensen | H04R 5/033 |
| 2018/0234799 A1 | 8/2018 | Evans et al. | |
| 2020/0359134 A1 | 11/2020 | Tong et al. | |
| 2021/0068194 A1 | 3/2021 | Han et al. | |
| 2022/0141893 A1 | 5/2022 | Choi et al. | |
| 2022/0301410 A1* | 9/2022 | Erdmann, IV | H04W 4/021 |

FOREIGN PATENT DOCUMENTS

| | | | |
|---|---|---|---|
| KR | 10-1220911 | 1/2013 | |
| KR | 10-2016-0149393 | 12/2016 | |
| KR | 10-2017-0043098 | 4/2017 | |
| KR | 10-2019-0084584 | 7/2019 | |
| KR | 10-2020-0106743 | 9/2020 | |
| KR | 10-2302615 | 9/2021 | |
| KR | 20220103214 A * | 7/2022 | G08B 21/182 |

OTHER PUBLICATIONS

PCT/ISA/237 Written Opinion issued on PCT/KR2022/004047, Jul. 15, 2022, pp. 3.
Korean Office Action dated Oct. 30, 2025 issued in counterpart application No. 10-2021-0038886, 13 pages.

* cited by examiner

Electronic Device (211)

610

Wireless Communication Circuit

620

Processor

630

Memory

FIG.6

Second Device (213)

710
Wireless Communication Circuit

720
Processor

730
Memory

FIG.7

METHOD AND DEVICE FOR IDENTIFYING LOST STATE OF ELECTRONIC DEVICE

CROSS-REFERENCE TO RELATED APPLICATIONS

This application is a Bypass Continuation Application of International Application No. PCT/KR2022/004047, which was filed on Mar. 23, 2022, and is based on and claims priority under 35 U.S.C. § 119 to Korean Patent Application No. 10-2021-0038886, which was filed in the Korean Intellectual Property Office on Mar. 25, 2021, the entire disclosure of each of which is incorporated herein by reference.

BACKGROUND

1. Field

The disclosure relates generally to an electronic device, and more particularly, to a technology for determining a lost state of an electronic device based on a communication situation of the electronic device.

2. Description of Related Art

With the recent proliferation of various electronic products, users are using many electronic devices, such as smart watches, earphones, and tablets, in connection with a smart phone. A small-sized electronic device, such as an earphone, may easily be lost by a user. A manufacturer or a service provider may provide a positioning service for an electronic device in the case of such misplacement.

When disconnected to an external device (e.g., a mother terminal which has registered the electronic device to a server by using the same user account as that for the mother terminal itself), the electronic device may recognize that the electronic device itself has been lost and may broadcast an advertising packet including identification (ID) information so as to notify this lost state Nearby electronic devices may scan the packet broadcast by the electronic device and transmit the packet with positioning information to the server. The server may provide a positioning service for the electronic device by sharing the positioning information with the external device (e.g., the mother terminal) registered using the same account as that for the electronic device.

If there is a disconnection to a mother terminal, an electronic device may recognize that the electronic device itself has entered a lost state and may perform an advertising operation to notify the same. However, if a wireless network environment to which the electronic device belongs is congested or if it is difficult for the mother terminal to assign a time slot for maintaining the connection to the electronic device due to other operations, the electronic device may perform an advertising operation even though no actual loss has occurred. The advertising operation that is continuously performed when actual loss is uncertain may cause the electronic device to consume unnecessary power. In this case, the electronic device may be discharged when the communication connection to the mother terminal has not been restored, thereby compromising the ability to accurately determine a lost state.

Accordingly, there is a need in the art for a method and apparatus for accurately determining whether the electronic device is actually lost, while providing a positioning service for the electronic device.

SUMMARY

The disclosure has been made to address at least the above-mentioned problems and/or disadvantages and to provide at least the advantages described below.

Accordingly, an aspect of the disclosure is to provide a method and apparatus for increasing the accuracy of determination of a lost state of an electronic device by additionally considering a communication connection state between the electronic device and one or more other electronic devices in addition to a communication connection state between the electronic device and a mother terminal.

Another aspect of the disclosure is to provide a method and apparatus for which the quality of a positioning service can be improved by dynamically changing loss determination criteria in consideration of location information or time information of an electronic device when the lost state of the electronic device is determined.

In accordance with an aspect of the disclosure, an electronic device may include a wireless communication circuit configured to support communication connections to one or multiple devices, at least one processor operatively connected to the wireless communication circuit, and a memory operatively connected to the at least one processor, wherein the memory stores instructions causing, when executed, the at least one processor to identify whether a first communication connection to a second external device through the wireless communication circuit is disconnected, acquire, if disconnection of the first communication connection is identified, communication state information from a first external device connected through the wireless communication circuit, identify, based on the acquired communication state information, whether a second communication connection between the first external device and the second external device is disconnected, and operate in a loss occurrence mode for the second external device if disconnection of the second communication connection is identified.

In accordance with an aspect of the disclosure, a method of an electronic device may include identifying whether a first communication connection to a second external device is disconnected, if disconnection of the first communication connection is identified, acquiring communication state information from a first external device, based on the acquired communication state information, identifying whether a second communication connection between the first external device and the second external device is disconnected, and if disconnection of the second communication connection is identified, determining to operate in a loss occurrence mode for the second external device.

In accordance with an aspect of the disclosure, an electronic device may include a wireless communication circuit configured to support communication connections to multiple external electronic devices, at least one processor operatively connected to the wireless communication circuit, and a memory operatively connected to the at least one processor, wherein the memory stores instructions causing, when executed, the at least one processor to identify a state of a communication connection to a first external device among the multiple external electronic devices, identify a state of a communication connection to a second external device among the multiple external electronic devices, and determine whether the electronic device is lost, based on at least one of the state of the communication connection to the first external device or the state of the communication connection to the second external device.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 6 illustrates a configuration of the electronic device according to an embodiment;

FIG. 7 illustrates a configuration of the second device according to an embodiment;

DETAILED DESCRIPTION

Hereinafter, embodiments of the disclosure will be described in detail with reference to the accompanying drawings. Descriptions of well-known functions and/or configurations will be omitted for the sake of clarity and conciseness.

Figure 1:
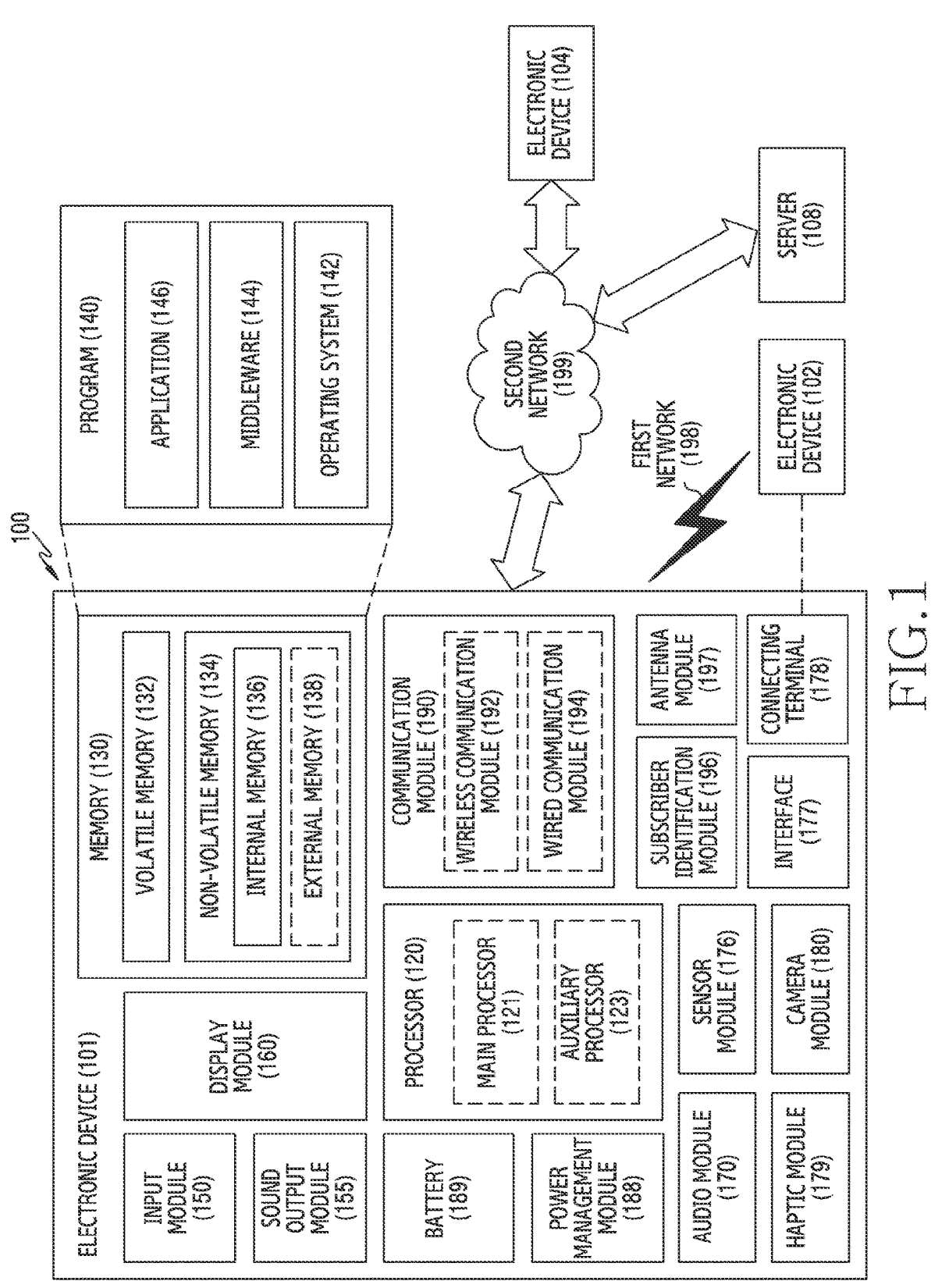
FIG. 1 is a block diagram of an electronic device in a network environment according to an environment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
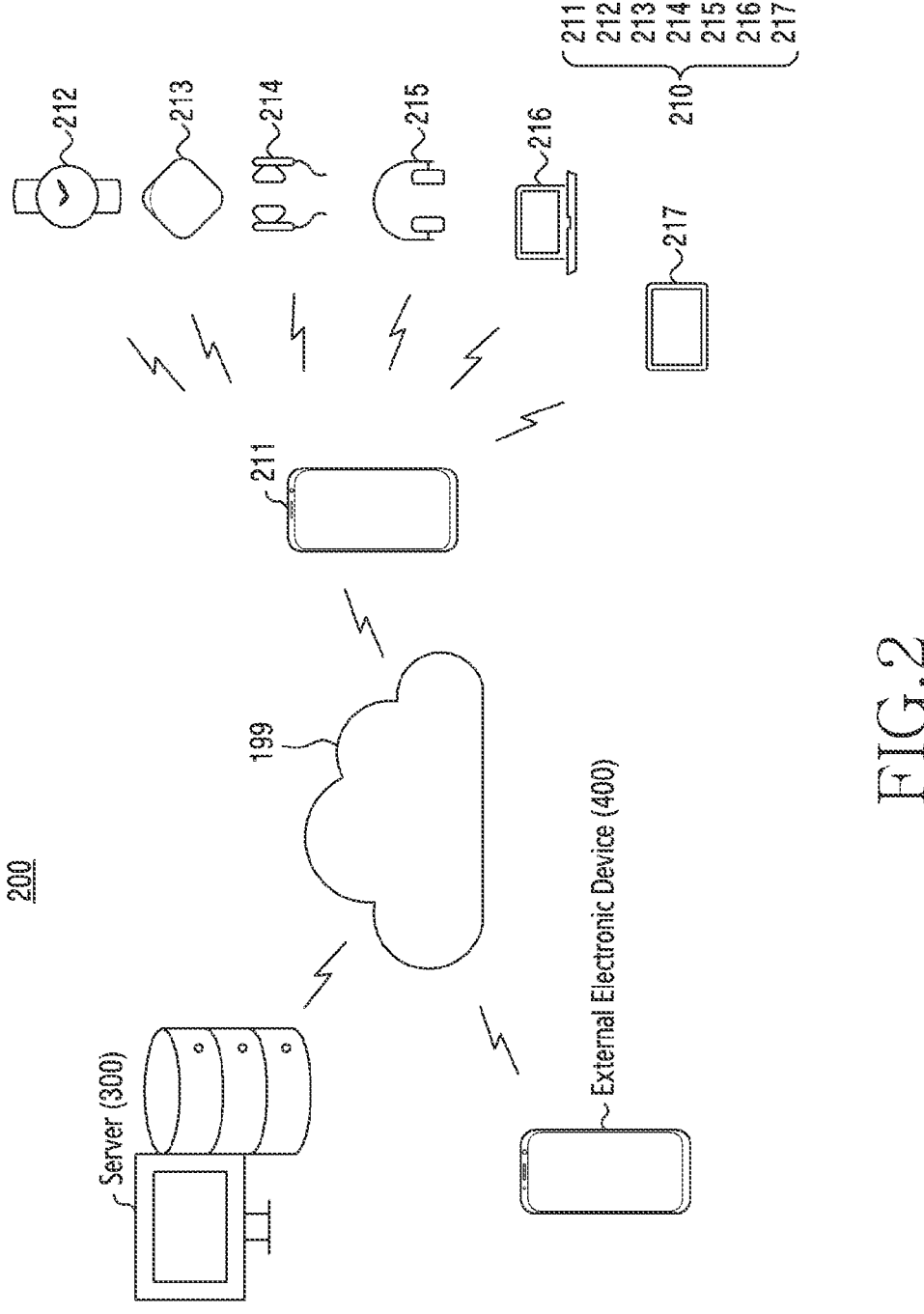
FIG. 2 illustrates a system that identifies a location of a user device according to an embodiment.

FIG. 2 illustrates a system that identifies a location of a user device according to an embodiment.

Referring to FIG. 2, a system 200 may include user devices 210, a server 300, and one or more external electronic devices 400. At least one of the external electronic devices 400 and the user devices 210 may be connected to the server 300 via the second network 199 (e.g., a Wi-Fi or cellular network).

The user devices 210 may include multiple devices, such as an electronic device 211, a first device 212, a second device 213, a third device 214, a fourth device 215, a fifth device 216, or a sixth device 217. For example, the electronic device 211 may be a mobile communication device, such as a smartphone. The first device 212 may be a wearable device that is wearable on a part of a user's body, such as a smart watch. The second device 213 is a small-sized tag device which may be in a form of a small object, such as a key ring or a button, or may be manufactured to be mountable on another electronic device or object. The third device 214 may be a wireless earphone, such as earbuds. The fourth device 215 may be a Bluetooth™ headphone or headset. The fifth device 216 may be a notebook computer. The sixth device 217 may be a tablet device. In addition to the examples shown in FIG. 2, a user may use various types of other devices in linkage with the electronic device 211. For example, a key fob, a wallet, a backpack, a dog or cat identification device, a car, a bicycle, an identification card, a briefcase, an umbrella, or other gear may also be linked with the electronic device 211 if communication functions described herein are satisfied. The electronic device 211 may, when necessary (e.g., when lost), track a location of a device that can be linked. A user may use two or more of the same devices. For example, a user may use multiple smartphones (e.g., the electronic device 211) by linking the same to each other. A user may also use two or more tablets (e.g., the sixth device 217) by linking the same to the electronic device 211.

The user devices 210 may be connected to each other using one or multiple communication protocols. For example, the electronic device 211 may be connected to at least one of the first device 212, the second device 213, the third device 214, the fourth device 215, the fifth device 216, or the sixth device 217 via a local area network. A LAN for establishing a connection between the user devices 210 may be appropriately selected. For example, together with or instead of Bluetooth™, Bluetooth low energy (BLE), Wi-Fi direct, near field communication (NFC), ultra-wide band (UWB) communication, or infra-red communication may be used to establish a connection between the user devices 210. The user devices 210 may establish a connection using a mesh network (e.g., ZigBee™ or Z-Wave) for short-range wireless communication.

The user devices 210 may be connected to each other by using different schemes according to device information (e.g., device elements). For example, if at least one of the user devices 210 is an IP-based device, a connection to the second network 199 may be established using a service set identifier (SSID), and in a case other than an IP-based device (e.g., BLE, ZigBee™, or Z-Wave), a connection to the second network 199 may be established using the electronic device 211 or a hub device.

At least one of the user devices 210 may broadcast an advertising packet for providing a finding function when lost. For example, if it is determined that the second device 213 has been lost, the second device 213 may broadcast various information including its' ID information by using an advertising packet. The packet may be broadcast so as to be received by one or multiple electronic devices (e.g., the external electronic device 400) located within a predetermined communicable distance from the second device 213. Herein, a packet or an advertising packet may be understood as a signal, message, or beacon via which loss of a device may be recognized.

At least one of the user devices 210 may determine a lost state of itself according to various criteria. For example, if a designated time elapses from a point in time when a connection to the electronic device 211, which is a mother terminal or a main terminal, has been made for the last time (or when a communication connection is disconnected), the second device 213 may determine that the second device 213 itself has been lost. If the second device 213 is connected to multiple other devices, the second device 213 may determine whether the second device 213 itself is lost, in consideration of a state of a communication connection to each of the multiple other devices. In determination of a lost state, the second device 213 may additionally consider a remaining battery level of the second device 213. The criteria for determining the lost state may be variously applied by a configuration of a user or a manufacturer.

The description of the electronic device 101, which has been provided with reference to FIG. 1, may be appropriately applied to the user devices 210. For example, if the electronic device 211 of a user is a smartphone, the electronic device 211 of FIG. 2 and the electronic device 101 of FIG. 1 may be the same device. As another example, if the third device 214 of the user is earbuds having no display, description other than that of the display module 160 in the description of the electronic device 101 illustrated in FIG. 1 may be appropriately applied to the third device 214.

The server 300 may correspond to the server 108 of FIG. 1. If at least one of the devices 212, 213, 214, 215, 216, and 217 remaining after excluding the electronic device 211 from the user devices 210 is lost, the server 300 may provide a function of identifying a location of the at least one lost device. For convenience, a description will be provided based on an example in which the electronic device 211 identifies a location of the lost second device 213, if the second device 213 among the user devices 210 is lost.

The external electronic device 400 may be of a user other than an owner of the second device 213. The external electronic device 400 may be located near the second device 213 so as to directly or indirectly acquire an advertising packet broadcast by the second device 213. The external electronic device 400 may include a short-range communication circuit for receiving a signal broadcast by the second device 213 using a short-range communication technique (e.g., BLE). The external electronic device 400 may include a global positioning system (GPS) circuit for positioning itself. The external electronic device 400 may include a telecommunication circuit that supports a cellular network and/or Wi-Fi network for transmitting its' location and information on the second device 213 to the server 300.

The external electronic device 400 may be (e.g., a smartphone) of the same type as the electronic device 211. Some or all of the descriptions for the electronic device 101, which are provided with reference to FIG. 1, may be applied to the external electronic device 400. Herein, descriptions of configurations or functions of the electronic device 211 may also be applied to the external electronic device 400, but may not be necessarily limited thereto. The external electronic device 400 may be any electronic device that supports the aforementioned communication function.

Figure 3:
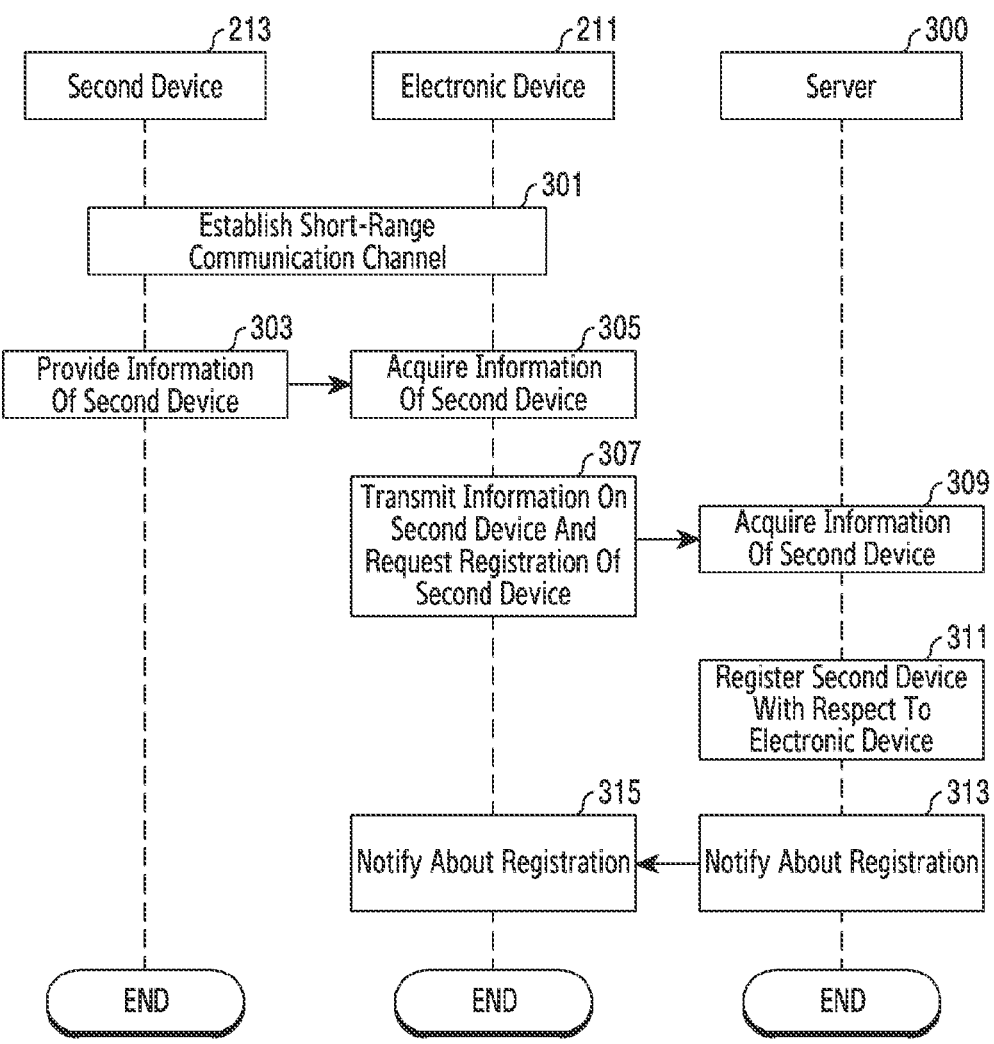
FIG. 3 illustrates a method in which an electronic device registers a second device in a server, according to an embodiment.

FIG. 3 illustrates a method in which the electronic device 211 registers the second device 213 in a server, according to an embodiment.

Referring to FIG. 3, in step 301, the electronic device 211 may establish a short-range communication channel with the second device 213. For example, the short-range communication channel may be a device-to-device connection, such as Bluetooth™, but is not limited thereto. Together with or instead of Bluetooth™, BLE, Wi-Fi direct, NFC, UWB communication, or infra-red communication may be used to establish a connection between the electronic device 211 and the second device 213.

In step 303, the second device 213 may provide information of the second device 213 to the electronic device 211 via the short-range communication channel. The information of the second device 203 may include a type (e.g., a tag, a smart watch, or a tablet) of the second device 213, unique ID information (e.g., a device ID), a manufacturer of the second device 213, hardware information (e.g., processor performance, memory capacity, and/or battery capacity) of the second device 213, software information (e.g., an operating system type and version, installed applications, and/or whether a device finding service is supported) of the second device 213, and/or information on communication performance (e.g., whether Bluetooth™, BLE, UWB, cellular, Wi-Fi, NFC, and/or magnetic secure transmission (MST) is supported).

In step 305, the electronic device 211 may acquire the information of the second device 213. The electronic device 211 may store the acquired information of the second device 213 in a memory of the electronic device 211.

In step 307, the electronic device 211 may transmit the information of the second device 213 to the server 300 and may request registration of the second device 213. For example, the electronic device 211 may transmit a message of a designated format to the server 300. The message of the designated format may include information and user information of the electronic device 211, the registration request of the second device 213, and/or the information of the second device 213. The electronic device 211 may add, to the message of the designated format, second device-related configuration information such as an alias or importance configured for the second device by a user and information on another device connectible to the second device 213 so as to transmit the message to the server 300. The electronic device 211 may request, from the server 300, registration of the second device 213 in a user account associated with the electronic device 211 itself. For example, if the electronic device 211 is registered in a first user account registered in the server 300, the electronic device 211 may also request registration of the second device 213 in the first user account by transmitting the message to the server 300. As another example, if the electronic device 211 is registered in the first user account registered in the server 300, and the second device 213 is registered in a second user account registered in the server 300, the electronic device 211 may, by transmitting the message to the server 300, request registration in a third user account (e.g., a group account) including the first user account and the second user account or delete the information of the second device 213 registered in the second user account and request registration of the second device 213 in the first user account.

In step 309, the server 300 may acquire information of the second device 213 from the electronic device 211. The server 300 may be connected to the electronic device 211 via a predetermined cellular or Wi-Fi network. The server 300 may acquire the information of the second device 213 transmitted from the electronic device 211 via the predetermined network.

In step 311, the server 300 may register the second device 213 with respect to the electronic device 211. For example, the server 300 may also register the second device 213 for the first user account corresponding to the electronic device 211 by using the information acquired from the electronic device 211.

In step 313, the server 300 may transmit a notification indicating that the second device 213 has been registered for the electronic device 211. In step 315, the electronic device 211 may receive a registration notification from the server 300.

Steps 301 to 315 may be referred to as a registration procedure or an onboarding procedure of the second device 213. The registration procedure or the onboarding procedure may include storing ID information of the second device 213 (e.g., a tracker) in the server 300.

When a designated time elapses after disconnection from the electronic device 211, the second device 213 may recognize that the second device 213 itself has been lost, and may broadcast an advertising packet including its' ID information, as will be described later.

Figure 4:
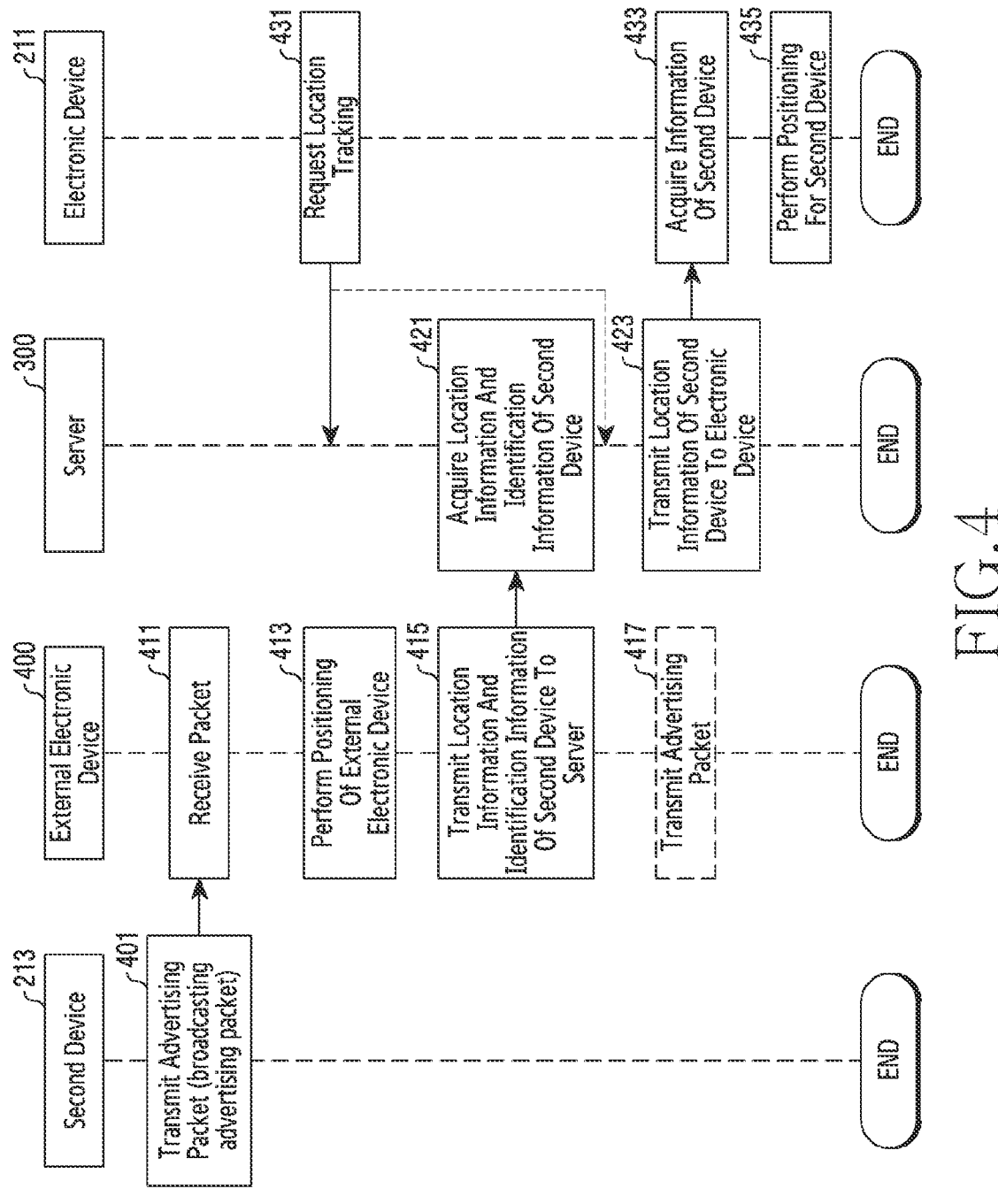
FIG. 4 illustrates a method of tracking a current location of the second device which has been lost, according to an embodiment.

FIG. 4 illustrates a method of tracking a current location of the second device 213 which has been lost, according to an embodiment. FIG. 4 shows a situation in which the electronic device 211 and the second device 213 share the same user account, and the second device 213 in these two devices is lost. The external electronic device 400 is any device independent of a user of the electronic device 211 and may be understood as a device located in a distance in which a packet broadcast from the second device 213 may be received.

In step 401, the second device 213 may broadcast an advertising packet by using a designated communication protocol. The designated communication protocol may correspond to a type of low-power short-range communication protocol for minimizing battery consumption. For example, the designated communication protocol may be BLE.

The second device 213 may broadcast an advertising packet when a lost state is detected. Conditions for determining that the second device 213 is lost may be configured in various manners. Alternatively, the second device 213 may broadcast an advertising packet regardless of detecting a lost state. For example, the second device 213 may repeatedly broadcast an advertising packet for a specific time (e.g., 15 minutes) at each predetermined period (e.g., 1 hour). Alternatively, the second device 213 may repeatedly broadcast the advertising packet for a specific time at each designated time (e.g., a user configured time).

In step 411, the external electronic device 400 may receive the advertising packet broadcast by the second device 213. The external electronic device 400 may include various communication circuits. For example, the external electronic device 400 may include a first wireless communication circuit that supports short-range communication for reception of the advertising packet and a second wireless communication circuit that supports telecommunication (e.g., cellular communication) for communication with the server 300. The external electronic device 400 may include a GPS for positioning of itself. In addition to GPS, a positioning system using a base station or an access point of Wi-Fi or a positioning system using an NFC beacon may be included.

The advertising packet broadcast by the second device 203 uses the designated short-range communication protocol. Therefore, reception of the advertising packet may indicate that the second device 213 and the external electronic device 400 coexist within a communication distance allowed by the short-range communication protocol. For example, when the external electronic device 400 receives the advertising packet via BLE, it may be estimated that the external electronic device 400 is located within about 100 meters (m) from the second device 213. Accordingly, from a macroscopic point of view, the location of the external electronic device 400 may be treated identically as the location of the second device 213. The second device 213 may broadcast the advertising packet with a designated strength. For example, it may be determined that the external electronic device 400 having received the advertising packet transmitted with the designated strength is located within a designated range from the second device 213.

In step 413, the external electronic device 400 may measure the location of the external electronic device 400 by using the positioning circuit. The external electronic device 400 may determine its own location (e.g., latitude and/or longitude coordinates), based on a measurement result. For example, the external electronic device 400 may control the positioning circuit to receive GPS signals from the outside (e.g., three or more satellites). The external electronic device 400 may identify, based on time information included in each of the GPS signals received from the outside, distance information from the external electronic device 400 to satellites having transmitted the GPS signals. For example, the external electronic device 400 may identify, using a triangulation technique, real-time location information of the external electronic device 400 from distance information corresponding to each of the satellites having transmitted the GPS signals. The external electronic device 400 may measure a distance between the external electronic device 400 and the second device 213 and may identify an accurate location of the second device 213, based on the measured distance. The distance between the external electronic device 400 and the second device 210 may be measured using BLE or a UWB triggered by BLE.

In step 415, the external electronic device 400 may transmit the measured location information and ID information of the second device 213 to the server 300. For example, the electronic device 400 may transmit a message including the location information and the ID information (e.g., a unique ID and/or a serial number) of the second device 213 to the server 300 by using the second wireless communication circuit. The external electronic device 400 may specify that the location information included in the message is the location information of the external electronic device 400 but may add the location information itself without specifying a subject of the location information.

In step 417, the external electronic device 400 may broadcast the advertising packet after transmitting the message to the server 300. For example, when the advertising packet acquired by the external electronic device 400 from the second device 213 is referred to as a first packet, and the advertising packet re-broadcast by the external electronic device 400 is referred to as a second packet, the second packet may include substantially the same or less content (data) compared to the first packet. For example, in a format of the second packet, at least some fields among multiple fields included in a format of the first packet may be omitted. Prior to or substantially concurrently with transmission of the message to the server 300, the external electronic device 400 may broadcast the advertising packet and may not perform step 417.

In step 421, the server 300 may acquire the message including the ID information and location information of the second device 203 from the external electronic device 400. Before or after acquisition of the message, in step 431, the server 300 may receive a request for tracking the location of the second device 203 from the electronic device 211. The server 300 may transmit the location information of the second device 213 to the electronic device 211 in step 423. For example, in step 431, the electronic device 211 may transmit a location tracking (or positioning) request for the second device 213 to the server 300, and in step 423, the server 300 may transmit the identified location information of the second device 213 to the electronic device 211 in response to the request received from the electronic device 211. For example, the server 300 may transmit most recently identified location information of the second device 213 to the electronic device 211 in step 423.

In step 433, the electronic device 211 may acquire the location information of the second device 213 from the server 300. In step 435, the electronic device 211 may perform positioning for the second device 213, based on the information acquired from the server 300. Steps 431, 433, and/or 435 may be implemented via an application providing a positioning service, which is mounted on the electronic device 211.

In step 421, if the ID information and location information of the second device 213 are acquired from the external electronic device 400, the server 300 may determine whether the location tracking request in step 431 has been received from the electronic device 211 having registered the second device 213 in the server 300 by using the first user account or another device having the first user account. For example, if no location tracking request in step 431 is received from the electronic device 211, the server 300 may not perform step 423. The server 300 may transmit a response message to the external electronic device 400, based on whether the location tracking request in step 431 has been received from the electronic device 211. For example, if the location tracking request in step 431 is received from the electronic device 211, the server 300 may transmit, to the external electronic device 400, a response message indicating that the ID information and location information of the second device 213 have been transmitted to the electronic device 211. If no location tracking request in step 431 is received from the electronic device 211, the server 300 may request not to transmit the ID information and location information of the second device 213 to the external electronic device 400 for a designated period of time. The external electronic device 400 may broadcast the advertising packet in step 417, based on the response from the server 300.

Figure 5:
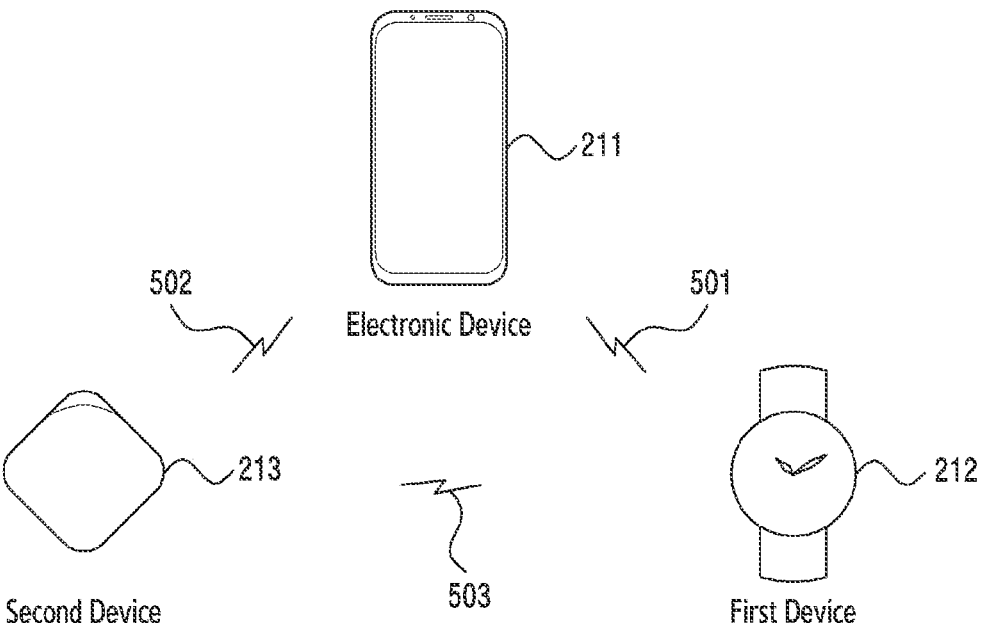
FIG. 5 illustrates a scheme of determining whether the second device has been lost, according to an embodiment.

FIG. 5 illustrates a scheme of determining whether the second device 213 has been lost, according to an embodiment. In FIG. 5, the electronic device 211, the first device 212, and the second device 213 are user devices registered using the same user account and may be connected to each other through a short-range communication channel (e.g., Bluetooth™ or Wi-Fi direct). The electronic device 211 is a mobile communication device, such as a smartphone, and may be a mother terminal of the first device 212 and the second device 213. The first device 212 may be a wearable device, such as a smart watch, which is wearable on a part of a user's body. The second device 213 is a small-sized tag device and may be used while being mounted on another electronic device or an object.

The first device 212 and the second device 213 may be classified according to an output function or a communication function of each device. For example, the first device 212 may have a display, and the second device 213 may have no display. The first device 212 may have both a function of scanning a signal broadcast from another electronic device and a function of broadcasting a signal to another electronic device, and the second device 213 may have only a function of broadcasting a signal to another electronic device. The fifth device 216 (e.g., a notebook computer) or the sixth device 217 (e.g., a tablet) among the user devices 210 shown in FIG. 2 may replace the first device 212. The third device 214 (e.g., a wireless earphone) or the fourth device 215 (e.g., a Bluetooth™ headphone) among the user devices 210 may replace the second device 213.

The electronic device 211 may be connected to the first device 212 via first communication 501 and may be connected to the second device 213 via second communication 502. The first device 212 and the second device 213 may be connected to each other via third communication 503.

The electronic device 211 may determine whether the second device 213 is lost, based on a state of a communication connection to the second device 213. For example, the electronic device 211 may determine whether the second device 213 is lost, based on at least one of a connection state of the second communication 502 and a connection state of the third communication 503. The electronic device 211 may detect the connection state of the second communication 502 by using the wireless communication circuit and may acquire information on a connection state of the third communication 503 from the first device 212 via the first communication 501 periodically or when a designated event (e.g., disconnection of a communication connection) occurs. If one of the second communication 502 or the third communication 503 is determined to be disconnected, the electronic device 211 may determine that there is a risk that the second device 213 is lost. The presence of the risk for loss may indicate that the second device 213 is not actually lost but is in a risk-of-loss state where the second device 213 is likely to be lost. If the second device 213 is determined to be in the risk-of-loss state, the electronic device 211 may perform operations corresponding to a first loss mode. For example, the first loss mode may be a risk-of-loss mode, which is an operation mode that may be configured in the electronic device 211 when the second device 213 is in the risk-of-loss state. In the first loss mode, the electronic device 211 may perform an operation for the second device 213 in the risk-of-loss state. The electronic device 211 may allow the user to recognize a possibility that the second device 213 is lost, or may provide guidance for reconnection of disconnected communication, in the first loss mode. The electronic device 211 may transmit, to the first device 212, information indicating the risk that the second device 213 is lost, or may broadcast the same to other nearby devices. In the first loss mode, the electronic device 211 may determine that a probability of successful communication reconnection to the second device 213 is high and may control to make a fervent attempt to reconnect disconnected communication among the second communication 502 and the third communication 503. The electronic device 211 may configure a frequency, a time, and/or a signal strength for a reconnection request, which is transmitted to the second device 213, to have greater values than those when normal signal transmission is performed.

If both communication connections of the second communication 502 and the third communication 503 are determined to be disconnected, the electronic device 211 may determine that the second device 213 is lost. If the second device 213 is determined to be in a loss occurrence state in which an actual loss has occurred, the electronic device 211 may perform operations corresponding to a second loss mode. The second loss mode may be a loss occurrence mode, which may be configured in the electronic device 211 when the second device 213 is in the loss occurrence state. In the second loss mode, the electronic device 211 may perform an operation for the second device 213 in the loss occurrence state. In the second loss mode, the electronic device 211 may determine that a possibility of successful communication reconnection to the second device 213 is low, and may configure the frequency, time, and/or signal strength for the reconnection request to have values less than or equal to those when normal signal transmission is performed. For example, the electronic device 211 may transmit, to the server 300, information on the occurrence of losing the second device 213 and/or a location tracking request, and may output a message relating to the loss occurrence. For example, the electronic device 211 may display, on a display, a message indicating that the second device 213 has been lost or may generate an audio signal indicating that the loss has occurred. In addition to the message relating to the occurrence of losing the second device 213, the electronic device 211 may further display information for providing a positioning service for the second device 213. In the second loss mode, due to disconnection of the third communication 503, there may also be a possibility that the first device 212 is lost, and the electronic device 211 may determine that the first device 212 is in the risk-of-loss state and may perform the operations corresponding to the first loss mode for the first device 212.

The electronic device 211 may immediately perform the operations corresponding to the second loss mode in relation to the second device 213 without determining the first loss mode or the second loss mode depending on a situation. For example, if disconnection of the communication connection of the second communication 502 is identified, the electronic device 211 may determine whether the location of the second device 213 belongs to a risk area. The risk area is a crowded location with a large floating population, such as a subway station or a bus stop, and may be configured by a manufacturer or a user of the electronic device 211 or may be received from a server 300 so as to be configured. If it is determined that the location of the second device 213 belongs to the risk area, the electronic device 211 may determine that the second device 213 has been lost, regardless of whether the third communication 513 is connected, and may perform the operations corresponding to the second loss mode.

The first device 212 may determine whether the second device 213 is lost, based on a state of the communication connection to the second device 213. For example, the first device 212 may determine whether the second device 213 is lost, based on at least one of the connection state of the second communication 502 and the connection state of the third communication 503. The first device 212 may detect the connection state of the third communication 503 by using the wireless communication circuit and may acquire information on the connection state of the second communication 502 from the electronic device 211 via the first communication 501 periodically or when a designated event (e.g., disconnection of a communication connection) occurs. If one of the second communication 502 of the third communication 503 is determined to be disconnected, the first device 212 may determine that there is a risk that the second device 213 is lost. If it is determined that the second device 213 is in the risk-of-loss state where the second device 213 is likely to be lost, the first device 212 may perform the operations corresponding to the first loss mode. In the first loss mode, the first device 212 may perform an operation for the second device 213 in the risk-of-loss state. For example, the first device 212 may determine that a probability of successful reconnection to the second device 213 is high, and may make a strong attempt at reconnection to the second device 213. The first device 212 may transmit, to the electronic device 211, information indicating a risk that the second device 213 is lost, or may broadcast the same to other nearby devices. If both connections of the second communication 502 and the third communication 503 are determined to be disconnected, the first device 212 may determine that the second device 213 is lost. If the second device 213 is determined to be in the loss occurrence state in which an actual loss has occurred, the first device 212 may perform the operations corresponding to the second loss mode for the second device 213. In the second loss mode, the first device 212 may perform an operation for the second device 213 in the loss occurrence state. For example, the first device 212 may transmit information on the occurrence of loss to the server 300 and may output a message relating to the occurrence of loss. The first device 212 may, display, on the display, a message indicating that the second device 213 has been lost, or may generate an audio signal indicating that the loss has occurred.

The second device 213 may determine, at each specific time, the connection state of the second communication 502 to the electronic device 211, or the connection state of the third communication 503 to the first device 212 and may determine whether the second device 213 itself is lost, based on the determined connection state. For example, if it is detected that the communication connection of one of the second communication 502 and the third communication 503 is disconnected, the second device 213 may determine that the second device 213 itself is in the risk-of-loss state and may perform the operations corresponding to the first loss mode. In this case, the second device 213 may configure a frequency, time, and/or signal strength for a reconnection attempt for disconnected communication to have greater values than those when normal signal transmission is performed. For example, if it is detected that the communication connections of both the second communication 502 and the third communication 503 are disconnected, the second device 213 may determine that the second device 213 itself is in the loss occurrence state and may perform the operations corresponding to the second loss mode. In this case, after attempting to reconnect the second communication 502 and the third communication 503 for a predetermined period of time or a predetermined number of times, and if the reconnection is not successful, the second device 213 may immediately perform an operation (e.g., outputting an alarm relating to the occurrence of loss or broadcasting a signal notifying of the occurrence of loss) corresponding to the occurrence of loss.

If the second device 213 is determined to be in the risk-of-loss state, the electronic device 211 (or the first device 212) may identify location information or time information of a point in time at which communication to the second device 213 has been disconnected. For example, if the location information is identified to be a risk-of-loss place (e.g., a crowded place with a large floating population, such as a subway station or a bus stop) or to correspond to a risk-of-loss time (e.g., time of high activity, such as commuting time), the electronic device 211 (or the first device 212) may change the lost state of the second device 213 to the loss occurrence state and may perform the operations corresponding to the second loss mode. As another example, if it is determined that a loss detection sensitivity has been configured to "high" by a user, the electronic device 211 (or the first device 212) may transmit information on the loss occurrence state of the second device 213 to the server 300, or output a message relating to the occurrence of loss, corresponding to the second loss mode in relation to the second device 213.

The electronic device 211 may also determine whether the first device 212 is lost, in the same manner as that for the second device 213. If it is determined that one communication connection among the connection state of the first communication 501 or the connection state of the third communication 503 is disconnected, the electronic device 211 may determine that the first device 212 is in the risk-of-loss state and may perform the operations corresponding to the first loss mode. When it is determined that the communication connections of both the first communication 501 and the third communication 503 are disconnected, the electronic device 211 may determine that the first device 212 is in the loss occurrence state and may perform the operations corresponding to the second loss mode. The aforementioned operation modes according to the lost state determination and lost state of the second device 213 may be also applied to the first device 212 in the same manner.

Figure 6:
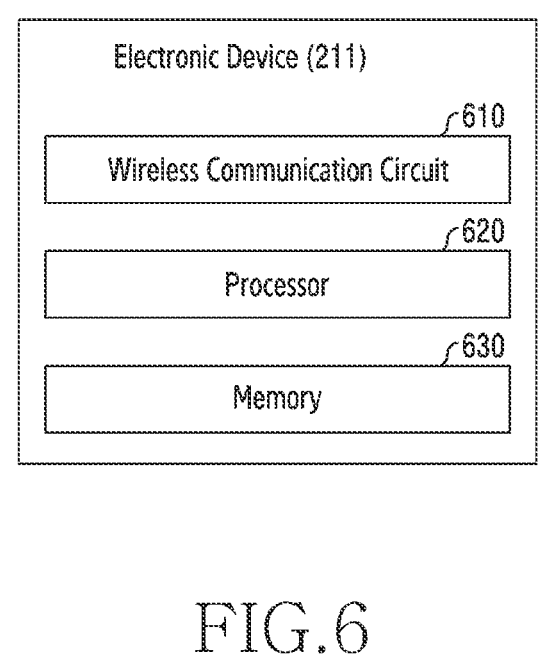

FIG. 6 illustrates a configuration of the electronic device 211 according to an embodiment.

Referring to FIG. 6, the electronic device 211 is a smartphone or a tablet computer which can be linked with multiple devices by using a short-range wireless communication connection, and may include a wireless communication circuit 610, at least one processor 620, and a memory 630. In FIG. 6, the electronic device 211 may correspond to the electronic device 101 illustrated in FIG. 1 or the electronic device 211 illustrated in FIG. 2 to FIG. 5.

The wireless communication circuit 610 (e.g., the wireless communication module 192 of FIG. 1) may support communication connections with multiple devices. According to various embodiments, the wireless communication circuit 610 may communicate with devices located within a predetermined distance by using short-range communication, such as Bluetooth™, Wi-Fi direct, BLE, or UWB communication or may communicate with an external electronic device located outside the predetermined distance by using telecommunication, such as cellular or Wi-Fi.

The memory 630 (e.g., the memory 130 of FIG. 1) may store instructions controlling, when executed, the at least one processor 620 (e.g., the processor 120 of FIG. 1) to perform various operations. For example, the at least one processor 620 may determine whether another electronic device, which has established a communication connection to the electronic device 211, is lost, and may perform operations corresponding to a result of the determination.

The at least one processor 620 may establish a wireless communication channel with at least two devices by using the wireless communication circuit 610. For example, the at least one processor 620 may control the wireless communication circuitry 610 to connect first communication to the first device 212 and to connect second communication to the second device 213. The first device 212 and the second device 213 may be registered using the same user account as that for the electronic device 211, so that the electronic device 211 serves as a mother terminal thereof. The at least one processor 620 may search for devices located within the predetermined distance via Bluetooth™ scan or BLE scan and may establish a communication connection to the first device 212 or the second device 213 among the found devices.

The at least one processor 620 may identify a connection state of the second communication established between the electronic device 211 and the second device 213. For example, the at least one processor 620 may continuously identify the connection state of the second communication from the wireless communication circuit 610 so as to determine whether the second communication maintains the connection or is disconnected.

The at least one processor 620 may acquire communication state information from the first device 212 and may identify the connection state of third communication between the first device 212 and the second device 213, based on the acquired communication state information. The communication state information may include at least one of ID information (e.g., a device ID or a wireless IP address) of the second device 213 or whether the third communication maintains the connection, and disconnection-related information may be further included if the third communication is disconnected. The disconnection-related information may include at least one of a cause of disconnection, a disconnection time, a disconnection location, or configuration information prior to disconnection (e.g., a signal strength, a remaining battery level, a reconnection-related configuration value, and/or a loss detection configuration value). The at least one processor 620 may determine whether the third communication established between the first electronic device 212 and the second device 213 maintains the connection or is disconnected, based on the communication state information acquired via the first communication or the second communication. The at least one processor 620 may acquire the communication state information at each designated time period or in response to occurrence of a designated event (e.g., transmission of information on disconnection of the second communication or disconnection of the third communication).

The at least one processor 620 may determine whether the second device 213 is lost, based on at least one of the connection state of the second communication and the connection state of the third communication. For example, if one of the second communication or the third communication is determined to be disconnected, the at least one processor 620 may determine that the second device 213 is not actually lost but is in the risk-of-loss state where the second device 213 is likely to be lost, and may perform operations corresponding to the above-described risk-of-loss mode (e.g., the first loss mode described in the embodiment of FIG. 5). If both the second communication and the third communication are determined to be disconnected, the at least one processor 620 may determine that the second device 213 is in the loss occurrence state where an actual loss has occurred and may perform operations corresponding to the loss occurrence mode (e.g., the second loss mode described in the embodiment of FIG. 5). The electronic device 211 may identify that the second device 213 has additionally established communication connections to one or more external devices (e.g., the third device 214, the fourth device 215, the fifth device 216, or the sixth device 217 of FIG. 2) in addition to the electronic device 211 and the first device 212. For example, if three or more communication connections are established for the second device 213, the at least one processor 620 may operate in the loss occurrence mode for the second device 213 if it is determined that two or more communication connections among the three or more established communication connections are disconnected. If the second communication established for the second device 213 is determined to be disconnected, the at least one processor 620 may transmit, to the first device 212, a first signal relating to the disconnection of the second communication. The first signal may include at least one of ID information (e.g., a device ID, or a wireless IP address) of the second device 213, a cause of disconnection, a disconnection time, a disconnection location, or configuration information prior to disconnection (e.g., a signal strength, a remaining battery level, a reconnection-related configuration value, or a loss detection configuration value). The at least one processor 620 may acquire the communication state information of the third communication in response to the first signal. If the third communication is determined, based on the communication state information, to maintain the connection, the at least one processor 620 may determine that the second device 213 is at the risk of loss and may perform the operations corresponding to the risk-of-loss mode. If the third communication is determined to be disconnected, based on the communication state information, then the at least one processor 620 may determine that the second device 213 has been lost, and may perform the operations corresponding to the loss occurrence mode.

If the second communication is determined to be disconnected, the at least one processor 620 may determine the loss mode associated with the second external device 213, based on location information of the second external device 213. The at least one processor 620 may acquire the location information of the second external device 213 at each designated period or continuously by using at least one sensor (e.g., the sensor module 176 of FIG. 1). The at least one processor 620 may determine the location of the second external device 213, based on the acquired location information, and may determine whether the second external device 213 is in a location designated as a risk area. The risk area is a crowded place with a large floating population, such as a subway station or a bus stop, and may be configured by a manufacturer or a user of the electronic device 211 or may be received from a server (e.g., the server 300) so as to be configured. For example, if it is determined that the second external device 213 is in the risk area, the at least one processor 620 may perform the operations corresponding to the loss occurrence mode for the second external device 213 even without acquiring communication state information for the third communication from the first device 212. I the second communication is determined to be disconnected, the at least one processor 620 may identify a loss detection sensitivity configured by a user or time information of a point in time when the second communication is disconnected. If the time information corresponds to a risk time (e.g., time of high activity, such as commuting time) or the loss detection sensitivity is configured to "high", the at least one processor 620 may perform the operations corresponding to the loss occurrence mode for the second external device 213.

The at least one processor 620 may acquire the communication state information for the third communication from the first device 212 and then may identify the connection state of the second communication. If the third communication is determined to be disconnected, based on the communication state information, the at least one processor 620 may additionally identify the connection state of the second communication so as to determine whether the second device 213 is lost. As a result of the identification, if the second communication is maintaining the connection, the at least one processor 620 may determine that the second device 213 is in the risk-of-loss state where the second device 213 is at the risk of loss. As the result of the identification, if the second communication is disconnected, the at least one processor 620 may determine that the second device 213 is in the loss occurrence state where an actual loss has occurred.

If the second device 213 is determined to be in the risk-of-loss state, the at least one processor 620 may perform the operations corresponding to the risk-of-loss mode in relation to the second device 213. In the risk-of-loss mode, the at least one processor 620 may determine that a possibility of successful reconnection of disconnected communication to the second device 213 is high, and may configure, in order to make a fervent attempt to reconnect the disconnected communication, a frequency, a time, and/or a signal strength for a reconnection request, which is transmitted to the second device 213, to have greater values than those when normal signal transmission is performed.

For example, if the second communication is determined to be disconnected, the at least one processor 620 may transmit the reconnection request for the second communication to the second device 213 at least a predetermined number of times for a designated time period. If the third communication is determined to be disconnected, the at least one processor 620 may control the wireless communication circuit 610 to transmit, to the first device 212, a signal indicating to configure the signal strength to at least a designated level when the reconnection request for the third communication is made.

If the risk-of-loss mode is determined in relation to the second device 213, the at least one processor 620 may transmit, to the first device 212 or the server 300, information indicating a risk that the second device 213 is lost. The information indicating the risk of loss may include information indicating that the second device 213 is likely to be lost or information on establishment of reconnection to the second device 213.

If the second device 213 is determined to be in the loss occurrence state, the at least one processor 620 may perform the operations corresponding to the loss occurrence mode in relation to the second device 213. In the loss occurrence mode, the at least one processor 620 may transmit, to the server 300, information indicating that the second device 213 has actually been lost. The server 300 may be an external device which registers and manages a user account including the electronic device 211 and provides a positioning service for the second device 213. If the second device 213 is in the loss occurrence state, the at least one processor 620 may determine that the possibility of successful communication reconnection to the second device 213 is low, and may configure the frequency, time, and/or signal strength for the reconnection request to have values less than or equal to those when normal signal transmission is performed. The at least one processor 620 may output a message relating to the occurrence of losing the second device 213. For example, the at least one processor 620 may display, on a display (e.g., the display module 160 of FIG. 1), the message relating to the occurrence of loss, or may output, via a speaker (e.g., the sound output module 155 of FIG. 1), an audio signal indicating the occurrence of loss. As another example, the at least one processor 620 may generate a vibration signal of a pattern corresponding to the occurrence of loss via a vibration generation module (e.g., the haptic module 179 of FIG. 1).

The description of the electronic device 211 of FIG. 6 may be applied to the first device 212 illustrated in FIG. 2 or FIG. 5. In this case, the first device 212 may perform the operations of the electronic device 211 of FIG. 6.

Figure 7:
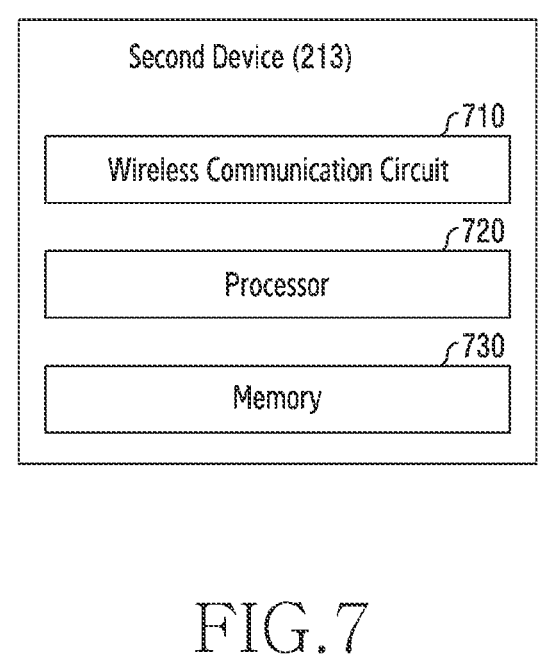

FIG. 7 illustrates a configuration of the second device 213 according to an embodiment.

Referring to FIG. 7, the second device 213 can be linked with a mother terminal (e.g., the electronic device 211), which is registered using the same user account, through a short-range wireless communication connection, and may include a wireless communication circuit 710, at least one processor 720, or a memory 730. In FIG. 7, the second device 213 may correspond to the second device 213 illustrated in FIG. 2 to FIG. 5, and the descriptions related to the communication module 190, the processor 120, or the memory 130 from among the descriptions relating to the electronic device 101 of FIG. 1 may be appropriately applied to the second device 213.

The wireless communication circuit 710 may support communication connections with multiple external electronic devices. For example, the wireless communication circuit 710 may communicate with devices located within a predetermined distance by using short-distance communication, such as Bluetooth™, Wi-Fi direct, or BLE. The wireless communication circuit 710 may broadcast an advertising packet including ID information of the second device 213 when a designated condition is satisfied (e.g., when occurrence of a loss is recognized).

The memory 730 may store instructions controlling, when executed, the at least one processor 730 to perform various operations. For example, the at least one processor 720 may determine whether the second device 213 is lost, based on connection states of established communication with other external electronic devices.

The at least one processor 720 may identify states of communication connection to multiple external electronic devices by using the wireless communication circuit 710. For example, the at least one processor 720 may identify a connection state of first communication established for a first external device and a connection state of second communication established for a second external device from among the multiple external electronic devices. The first external device and the second external device are registered using the same user account as that for the second device 213 and may include the electronic device 211 or the first device 212 described in FIG. 6.

The at least one processor 720 may determine whether the second device 213 is lost, based on at least one of the connection state of the first communication and the connection state of the second communication. For example, if one of the first communication or the second communication is determined to be disconnected, the at least one processor 720 may determine that the second device 213 is not actually lost but is in the risk-of-loss state where the second device 213 is likely to be lost. If both the first communication and the second communication are determined to be disconnected, the at least one processor 720 may determine that the second device 213 is in the loss occurrence state where an actual loss has occurred.

If the second device 213 is determined to be in the risk-of-loss state, the at least one processor 720 may perform operations corresponding to the risk-of-loss mode (e.g., the first loss mode described in the embodiment of FIG. 5). In the risk-of-loss mode, the at least one processor 720 may configure a frequency, a time, and/or a signal strength for a reconnection attempt for disconnected communication to have greater values than those when normal signal transmission is performed. For example, the at least one processor 720 may configure a strength of a signal for reconnection of the first communication or second communication to at least a designated level and may control the wireless communication circuit 710 to perform broadcasting at least a predetermined number of times for a designated time period. The at least one processor 720 may transmit and receive information indicating the risk of loss, via communication maintaining the connection in the first communication or the second communication.

If the second device 213 is determined to be in the loss occurrence state, the at least one processor 720 may perform operations corresponding to the loss occurrence mode (e.g., the second loss mode described in the embodiment of FIG. 5). In the loss occurrence mode, the at least one processor 720 may attempt to reconnect the first communication or the second communication for a predetermined time or a predetermined number of times, and then may immediately perform, if the reconnection is not successful, the operations corresponding to the occurrence of loss. For example, the at least one processor 720 may output an alarm signal relating to the occurrence of losing the second device 213, or may broadcast a signal notifying of the occurrence of losing the second device 213, by using the wireless communication circuit 710.

Figure 8:
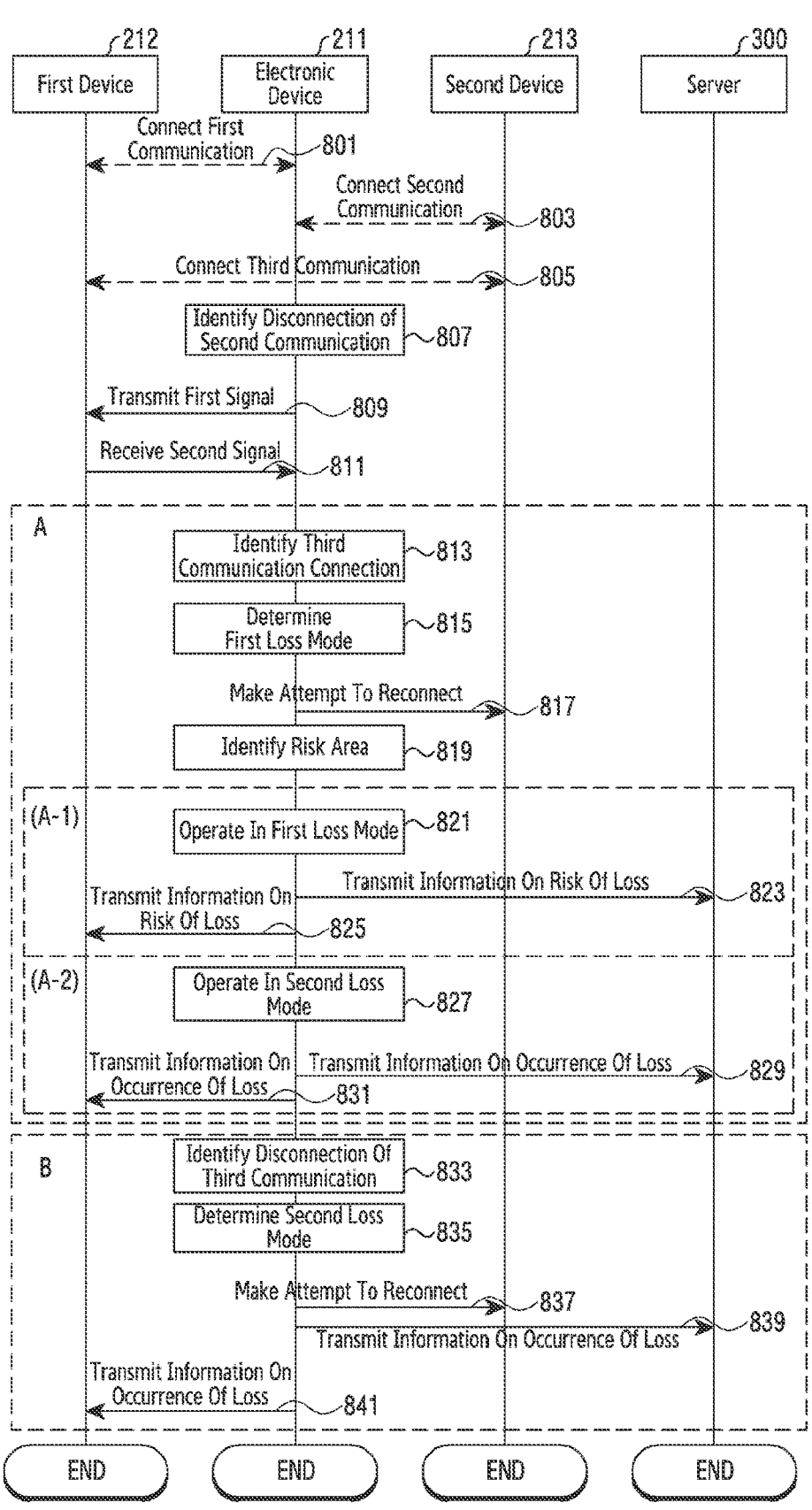
FIG. 8 illustrates a method in which the electronic device determines whether the second device is lost, according to an embodiment.

FIG. 8 illustrates a method in which the electronic device 211 determines whether the second device 213 is lost, according to an embodiment. In FIG. 8, the electronic device 211, the first device 212, and the second device 213 may be understood as user devices (e.g., the user devices 210 of FIG. 2) registered using the same user account. The electronic device 211 may be a mother terminal of the first device 212 and the second device 213. The server 300 may be an external device which registers and manages the user account and provides a positioning service for the second device 213.

Referring to FIG. 8, the electronic device 211 may connect first communication to the first device 212 in step 801 and may connect second communication to the second device 213 in step 803. In step 805, third communication may be connected between the first device 212 and the second device 213. The first communication, the second communication, or the third communication may be a scheme using a short-range wireless communication protocol, such as Bluetooth™, Wi-Fi direct, or BLE. While the first communication, the second communication, and the third communication are connected, the electronic device 211 may share, with the first device 212, information on a communication connection state (e.g., the second communication) for the electronic device 211 and the second device 213, and may receive, from the second device 213, information on a communication connection state (e.g., the third communication) for the second device 213 and the first device 212.

In step 807, the electronic device 211 may identify that the second communication established for the second device 213 has been disconnected. For example, the electronic device 211 may identify the disconnection of the second communication through the wireless communication circuit (e.g., the wireless communication module 192 of FIG. 1 or the wireless communication circuit 610 of FIG. 6). Although the electronic device 211 receives a signal from the second device 213, if a strength of the signal when received is identified to be less than or equal to a threshold reference, the second communication may be determined to be disconnected. For another example, if it is determined that a packet error rate (PER) of the signal received from the second device 213 is greater than or equal to a threshold reference, the electronic device 211 may determine that the second communication is disconnected.

In step 809, the electronic device 211 may transmit a first signal, which includes information on disconnection of the second communication, to the first device 212 via the first communication. For example, the information on disconnection of the second communication may include at least one of ID information (e.g., a device ID and a wireless IP address) of the electronic device 211, ID information of the second device 213, a cause of the disconnection, a disconnection time, a disconnection location, or configuration information prior to disconnection (e.g., a signal strength, a remaining battery level, a reconnection-related configuration value, and/or a loss detection configuration value).

In step 811, the electronic device 211 may receive a second signal including state information of the third communication from the first device 212 via the first communication. For example, the state information of the third communication may include at least one of the ID information of the second device 213 or whether the third communication maintains the connection, and if the third communication is disconnected, disconnection-related information may be further included. The disconnection-related information may include at least one of a cause of the disconnection, a disconnection time, a disconnection location, or configuration information prior to disconnection (e.g., a signal strength, a remaining battery level, a reconnection-related configuration value, and/or a loss detection configuration value). Step 811 may be performed at each designated time period or in response to occurrence of a designated event (e.g., transmission of information on disconnection of the second communication or the disconnection of the third communication).

If the second communication is disconnected, the electronic device 211 may determine whether the second device 213 is lost, based on the state information of the third communication. The operations of the electronic device 211 may be classified into CASE A (steps 813 to 831) or CASE B (steps 833 to 841) depending on whether the third communication is connected, which is determined based on the state information of the third communication.

If the third communication is determined to have maintained the connection, based on the state information of the third communication, which is included in the second signal, the electronic device 211 may perform steps 813 to 831 corresponding to CASE A. For example, if the third communication is determined to have maintained the connection in step 813, the electronic device 211 may determine, in step 815, that the second device 213 is in the risk-of-loss state and determine to be in the first loss mode. The first loss mode may correspond to the risk-of-loss mode described with reference to FIG. 6. When the first loss mode is determined, the electronic device 211 may attempt, in step 817, to reconnect the disconnected second communication. In this case, the electronic device 211 may determine that there is a high probability of successful communication reconnection to the second device 213, and may configure a frequency, a time, and/or a signal strength for a reconnection request, which is transmitted to the second device 213, to have greater values than those when normal signal transmission is performed. For example, the electronic device 211 may transmit the reconnection request for the second communication to the second device 213 more than a predetermined number of times for a designated time, may transmit the reconnection request for the second communication to the second device 213 over the designated time, or may configure the signal strength for the reconnection request to be greater than a designated signal strength so as to perform transmission.

When the first loss mode is determined, in step 819, the electronic device 211 may determine whether a location of the second device 213 is in a risk area. For example, the electronic device 211 may acquire location information of the second device 213 in each designated period while maintaining the third communication, and may determine whether the location of the second device 213 is in the risk area, based on the acquired location information. The risk area is a crowded place with a large floating population, such as a subway station or a bus stop, and may be configured by a manufacturer or a user of the electronic device 211 or may be received from a server so as to be configured. The electronic device 211 may determine whether time information of a point in time when the second communication is disconnected or a loss detection sensitivity configured by a user corresponds to a risk situation. The risk situation may refer to when the time information corresponds to a risk time (e.g., a time of high activity, such as commuting time) or the loss detection sensitivity is configured to "high". The operations of the electronic device 211 may be classified into CASE A-1 (steps 821 to 825) or CASE A-2 (steps 827 to 831) according to a determination result of step 819.

If it is determined, as the determination result, that the location of the second device 213 is not a risk area (or if it is determined that the second device 213 does not correspond to the risk situation), the electronic device 211 may perform steps 821 to 825 corresponding to CASE A-1. For example, the electronic device 211 may determine to operate in the first loss mode for the second device 213 in step 821. In the first loss mode, the electronic device 211 may transmit information indicating a risk of loss, which indicates that the second device 213 is likely to be lost, to the server 300 or the first device 212. The electronic device 211 may transmit the information indicating the risk of loss to the server 300 in step 823 and may transmit the information indicating the risk of loss to the first device 212 in step 825. In step 825, the electronic device 211 may broadcast the information indicating the risk of loss to other nearby devices.

If it is determined, as the determination result, that the location of the second device 213 is in the risk area, the electronic device 211 may perform steps 827 to 831 corresponding to CASE A-2. For example, the electronic device 211 may determine to operate in the second loss mode for the second device 213 in step 827. The second loss mode may correspond to the loss occurrence mode described with reference to FIG. 6. In the second loss mode, the electronic device 211 may transmit information on occurrence of loss, which indicates that the second device 213 has been lost, to the server 300 or the first device 212. The electronic device 211 may transmit the information on the occurrence of losing the second device 213 to the server 300 in step 829 and may transmit the information on the occurrence of losing the second device 213 to the first device 212 in step 831.

If disconnection of the second communication is identified in step 807, the electronic device 211 may determine the loss mode for the second external device 213, based on the location information of the second external device 213. For example, although no communication state information for the third communication is acquired from the first device 212, the electronic device 211 may perform steps corresponding to CASE A-1 or CASE A-2 according to whether the location of the second external device 213 is in the risk area. In this case, steps 809 to 815 may be omitted.

If disconnection of the third communication is determined based on the second signal, the electronic device 211 may perform steps 833 to 841 corresponding to CASE B. For example, if disconnection of the third communication is determined in step 833, the electronic device 211 may determine, in step 835, that the second device 213 is in the loss occurrence state and may determine the second device 213 to be in the second loss mode. In step 837, the electronic device 211 may attempt to reconnect the disconnected second communication. If the second device 213 is in the second loss mode, the electronic device 211 may determine that a possibility of successful communication reconnection to the second device 213 is not high, and may configure the frequency, time, and/or signal strength for the reconnection request, which is transmitted to the second device 213, to have values less than or corresponding to those when normal signal transmission is performed. For example, the electronic device 211 may transmit the reconnection request for the second communication to the second device 213 a predetermined number of times or for a designated time, and may determine, if the reconnection fails, that the second device 213 has been lost and output information related to the occurrence of loss. The information on the occurrence of loss may be provided using at least one output means of a display (e.g., the display module 160 of FIG. 1), a speaker (e.g., the sound output module 155 of FIG. 1), or a vibration generation module (e.g., the haptic module 179 of FIG. 1) which are provided in the electronic device 211.

In step 839, the electronic device 211 may transmit, to the server 300, the information on the occurrence of losing the second device 213. The information on the occurrence of loss may include at least one of ID information of the second device 213, a cause of disconnection, a disconnection time, a disconnection location, or configuration information prior to disconnection (e.g., a signal strength and a remaining battery level). The server 300 having received the information on the occurrence of loss may update information on the second device 213 or may transmit, in step 841, information on the loss occurrence state of the second device 213 to the first device 212 or to other electronic devices estimated as being in the vicinity of the second device 213. For example, other electronic devices estimated as being in the vicinity of the second device 213 may include a device registered using the same account as that for the second device 213 and the electronic device 211.

Step 811 may be performed before steps 807 to 809. In this case, if disconnection of the third communication is determined based on the state information acquired from the first device 212, the electronic device 211 may determine whether the second device 213 is lost, by additionally identifying the connection state of the second communication. For example, if the second communication is maintaining the connection as a result of the identification, the electronic device 211 may determine that the second device 213 is in the risk-of-loss state and may perform the operations corresponding to the first loss mode (e.g., steps 815 to 831 of CASE A). If the second communication is disconnected as a result of the identification, the electronic device 211 may determine that the second device 213 is in the loss occurrence state and may perform the operations corresponding to the second loss mode (e.g., steps 835 to 841 of CASE B).

Figure 9:
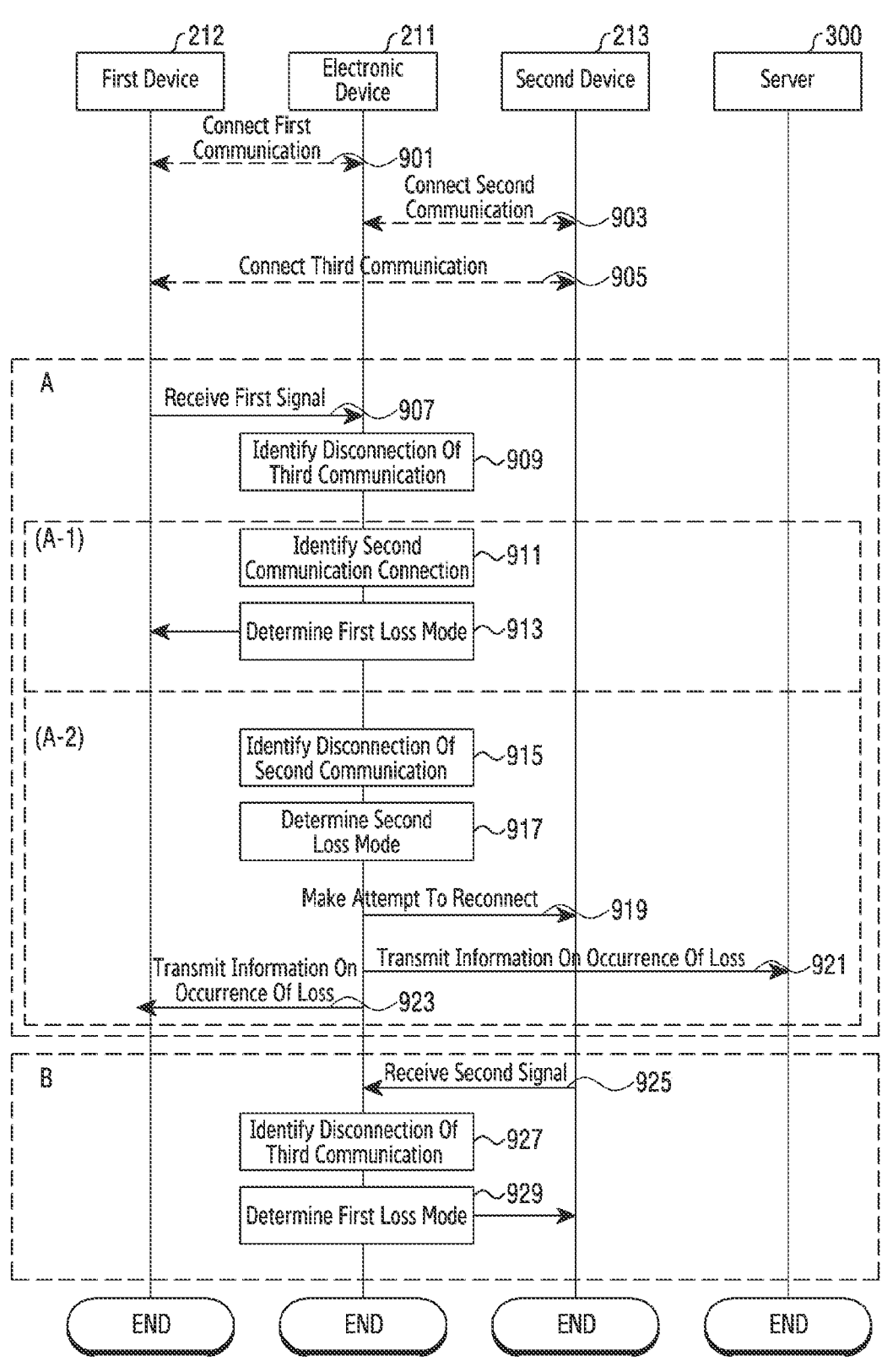
FIG. 9 illustrates a method in which the electronic device determines whether the second device is lost, according to an embodiment.

FIG. 9 illustrates a method in which the electronic device 211 determines whether the second device 213 is lost, according to an embodiment. In FIG. 9, the electronic device 211, the first device 212, and the second device 213 may be understood as user devices registered using the same user account. The electronic device 211 may be a mother terminal of the first device 212 and the second device 213. The server 300 may be an external device which registers and manages the user account and provides a positioning service for the second device 213.

Referring to FIG. 9, the electronic device 211 may connect first communication to the first device 212 in step 901 and may connect second communication to the second device 213 in step 903. In step 905, third communication may be connected between the first device 212 and the second device 213. The first communication, the second communication, or the third communication may be a scheme using a short-range wireless communication protocol, such as Bluetooth™, Wi-Fi direct, or BLE.

The electronic device 211 may acquire information on disconnection of the third communication from the first device 212 or the second device 213. Operations of the electronic device 211 may be classified into CASE A (steps 907 to 923) or CASE B (steps 925 to 929) according to a subject that transmits the information on disconnection of the third communication.

When the information on disconnection of the third communication is received from the first device 212, the electronic device 211 may perform steps 907 to 923 corresponding to CASE A. For example, in step 907, the electronic device 211 may receive a first signal including the information on disconnection of the third communication from the first device 212 via the first communication. For example, the information on disconnection of the third communication may include at least one of ID information of the second device 213, a cause of the disconnection, a disconnection time, a disconnection location, or configuration information prior to disconnection (e.g., a signal strength, a remaining battery level, a reconnection-related configuration value, and/or a loss detection configuration value). The electronic device 211 may determine, based on the first signal in step 909, that the third communication is disconnected, and may identify a connection state of the second communication so as to determine whether the second device 213 is lost. The operations of the electronic device 211 may be classified into CASE A-1 (steps 911 to 913) or CASE A-2 (steps 915 to 923) according to a determination result of step 909.

If the second communication is determined to have maintained the connection, the electronic device 211 may perform steps 911 to 913 corresponding to CASE A-1. For example, if the second communication is determined to have maintained the connection in step 911, the electronic device 211 may determine, in step 913, that the second device 213 is not actually lost but is in the risk-of-loss state where the second device 213 is likely to be lost, and may determine the second device 213 to be in the first loss mode. The first loss mode may correspond to the risk-of-loss mode described with reference to FIG. 6. In the first loss mode, the electronic device 211 may determine that a possibility of successful attempt to reconnect the disconnected third communication is high, and may transmit, to the first device 212, guidance information for the reconnection attempt. The guidance information for the reconnection attempt may include information indicating to configure a frequency, a time, and/or a signal strength for the reconnection request to have greater values than those when normal signal transmission is performed. When the first loss mode is determined, the electronic device 211 may additionally perform CASE A-1 (steps 821 to 825) or CASE A-2 (steps 827 to 831) of FIG. 8 according to determination of a risk area or a risk situation of the second device 213.

If the second communication is determined to be disconnected, the electronic device 211 may perform steps 915 to 923 corresponding to CASE A-2. For example, if disconnection of the second communication is determined in step 915, the electronic device 211 may determine, in step 917, that the second device 213 is in the loss occurrence state where an actual loss has occurred and may determine the second device 213 to be in the second loss mode. The second loss mode may correspond to the loss occurrence mode described with reference to FIG. 6. In step 919, the electronic device 211 may attempt to reconnect the second communication. In the second loss mode, the electronic device 211 may determine that the probability of successful communication reconnection to the second device 213 is not high, and may configure the frequency, time, and/or signal strength for the reconnection request, which is transmitted to the second device 213, to have values less than or corresponding to those when normal signal transmission is performed. In the second loss mode, the electronic device 211 may transmit information on the occurrence of losing the second device 213 to the server 300 in step 921 and may transmit the information on the occurrence of losing the second device 213 to the first device 212 in step 923.

When the information on disconnection of the third communication is received from the second device 213, the electronic device 211 may perform steps 925 to 929 corresponding to CASE B. For example, in step 925, the electronic device 211 may receive a second signal including the information on disconnection of the third communication from the second device 213 via the second communication. For example, the information on disconnection of the third communication may include at least one of ID information of the second device 213, a cause of the disconnection, a disconnection time, a disconnection location, or configuration information (e.g., a signal strength, a remaining battery level, a reconnection-related configuration value, and/or a loss detection configuration value) before disconnection. If disconnection of the third communication is determined based on the second signal in step 927, the electronic device 211 may determine, in step 929, that the second device 213 is in the risk-of-loss state and may determine to be in the first loss mode. In the first loss mode, the electronic device 211 may determine that the possibility of successful attempt to reconnect the disconnected third communication is high, and may transmit, to the first device 212 or the second device 213, guidance information for the reconnection attempt. The guidance information for the reconnection attempt may include information indicating to configure a frequency, a time, and/or a signal strength for the reconnection request to have greater values than those when normal signal transmission is performed. In the first loss mode, the electronic device 211 may additionally perform CASE A-1 (steps 821 to 825) or CASE A-2 (steps 827 to 831) of FIG. 8 according to determination of the risk area or risk situation of the second device 213.

In CASE B, the electronic device 211 may also determine whether the first device 212 is lost, in the same manner as that for the second device 213. If disconnection of the third communication is determined based on the second signal, the electronic device 211 may identify a connection state of the first communication so as to determine whether the first device 212 is lost. As a result of the identification, if the first communication maintains the connection, the electronic device 211 may determine that the first device 212 is in the risk-of-loss state and may perform step 913 corresponding to the first loss mode for the first device 212. As the result of the identification, if the first communication is determined to be disconnected, the electronic device 211 may determine that the first device 212 is in the loss occurrence state and may perform steps 917 to 923 corresponding to the second loss mode. The aforementioned operation modes according to the lost state determination and lost state of the second device 213 may be also applied to the first device 212 in the same manner.

Figure 10:
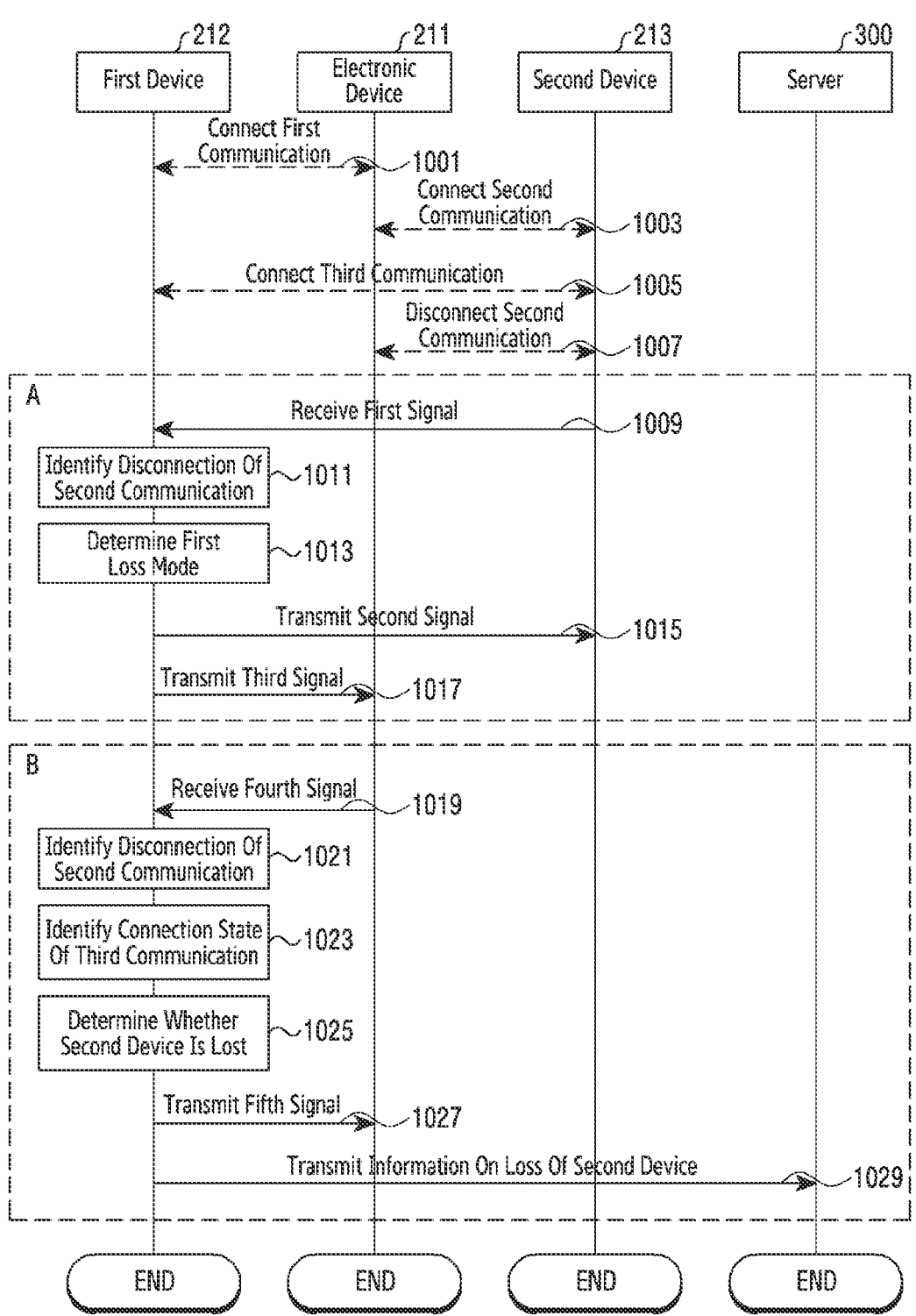
FIG. 10 illustrates a method in which a first device determines whether the second device is lost, according to an embodiment.

FIG. 10 illustrates a method in which the first electronic device 212 determines whether the second device 213 has been lost, according to an embodiment. In FIG. 10, the electronic device 211, the first device 212, and the second device 213 may be understood as user devices registered using the same user account. The electronic device 211 may be a mother terminal of the first device 212 and the second device 213. The server 300 may be an external device which registers and manages the user account and provides a positioning service for the second device 213.

Referring to FIG. 10, the first device 212 may connect first communication to the electronic device 211 in step 1001 and may connect third communication to the second device 213 in step 1005. In step 1003, second communication may be connected between the electronic device 211 and the second device 213. The first communication, the second communication, or the third communication may be a communication scheme using a short-range wireless communication protocol, such as Bluetooth™, Wi-Fi direct, or BLE.

In step 1007, the second communication connected between the electronic device 211 and the second device 213 may be disconnected. The first device 212 may receive information on disconnection of the second communication from the electronic device 211 or the second device 213. Operations of the first device 212 may be classified into CASE A (steps 1009 to 1017) or CASE B (steps 1019 to 1029) according to a subject that transmits the information on disconnection of the second communication.

When the information on disconnection of the second communication is received from the second device 213, the first device 212 may perform steps 1009 to 1017 corresponding to CASE A. For example, in step 1009, the first device 212 may receive, via the third communication, a first signal including the information on disconnection of the second communication from the second device 213. The information on disconnection of the second communication may include at least one of ID information of the electronic device 211, ID information of the second device 213, a cause of the disconnection, a disconnection time, a disconnection location, or configuration information prior to disconnection (e.g., a signal strength, a remaining battery level, a reconnection-related configuration value, and/or a loss detection configuration value). In step 1011, the first device 212 may determine, based on the first signal, that the second communication is disconnected. When the first signal is received from the second device 213, the first device 212 may determine that the connection of the third communication is maintained, and may determine, in consideration thereof, whether the second device 213 is lost. In step 1013, the first device 212 may determine that the second device 213 is not actually lost but is in the risk-of-loss state where the second device 213 is likely to be lost, and may determine the second device 213 to be in the first loss mode. The first loss mode may correspond to the risk-of-loss mode described with reference to FIG. 6. If the first loss mode for the second device 213 is determined, the first device 212 may transmit a second signal, which includes information indicating the risk of losing the second device 213, to the second device 213 in step 1015, and may transmit a third signal including information indicating the risk of loss to the electronic device 211 in step 1017.

When the information on disconnection of the second communication is received from the electronic device 211, the first device 212 may perform steps 1019 to 1029 corresponding to CASE B. For example, in step 1019, the first device 212 may receive, via the first communication, a fourth signal including the information on disconnection of the second communication. In step 1021, the first device 212 may determine, based on the fourth signal, that the second communication between the electronic device 211 and the second device 213 is disconnected. If the fourth signal is received from the electronic device 211, the first device 212 may additionally identify a connection state of the third communication so as to determine whether the second device 213 is lost. The first device 212 may identify, in step 1023, a connection state of the third communication by using a wireless communication circuit. The first device 212 may determine, in step 1025, whether the second device 213 is lost, based on the connection state of the third communication. For example, if the third communication is determined to have maintained the connection, the first device 212 may determine that the second device 213 is in the risk-of-loss state and may determine the second device 213 to be in the first loss mode. In this case, the first device 212 may transmit, in step 1027, a fifth signal including the information indicating the risk of losing the second device 213 to the electronic device 211. The first device 212 may also transmit, to the second device 213, the information indicating the risk of loss. If disconnection of the third communication is determined, the first device 212 may determine that the second device 213 is in the loss occurrence state where an actual loss has occurred, and may determine the second device to be in the second loss mode corresponding to the loss occurrence mode described with reference to FIG. 6. Although it is determined, in step 1025, that the third communication maintains the connection, the first device 212 may determine that the third communication is disconnected if a strength of a signal transmitted or received via the third communication is less than or equal to a threshold reference. In step 1027, the first device 212 may transmit, to the electronic device 211, a fifth signal including information on the occurrence of losing the second device 213. In step 1029, the first device 212 may transmit loss-related information for the second device 203 (information indicating the risk of loss or information on the occurrence of loss) to the server 300. The server 300 may update information on the second device 213, based on the loss-related information received from the first device 212, and may transmit the updated information to other electronic devices estimated to be located in the vicinity of the second device 213.

In the first loss mode, the first device 212 may directly determine whether the second device 213 is lost. For example, the first device 212 may determine whether the location of the second device 213, which is determined based on the first signal, is in a risk area. The risk area is a crowded place with a large floating population, such as a subway station or a bus stop, and may be configured by a manufacturer or a user of the first device 212 or may be received from a server 300 so as to be configured. If it is determined that the location of the second device 213 is in the risk area, the first device 212 may perform the operations corresponding to the second loss mode in relation to the second device 213. The first device 212 may determine whether time information of a point in time when the second communication is disconnected or a loss detection sensitivity configured by the user corresponds to a risk situation. The risk situation may refer to when the time information corresponds to a risk time (e.g., a time of high activity, such as commuting time) or the loss detection sensitivity is configured to "high". If it is determined that the second device 213 corresponds to the risk situation, the first device 212 may perform the operations corresponding to the second loss mode in relation to the second device 213.

Figure 11:
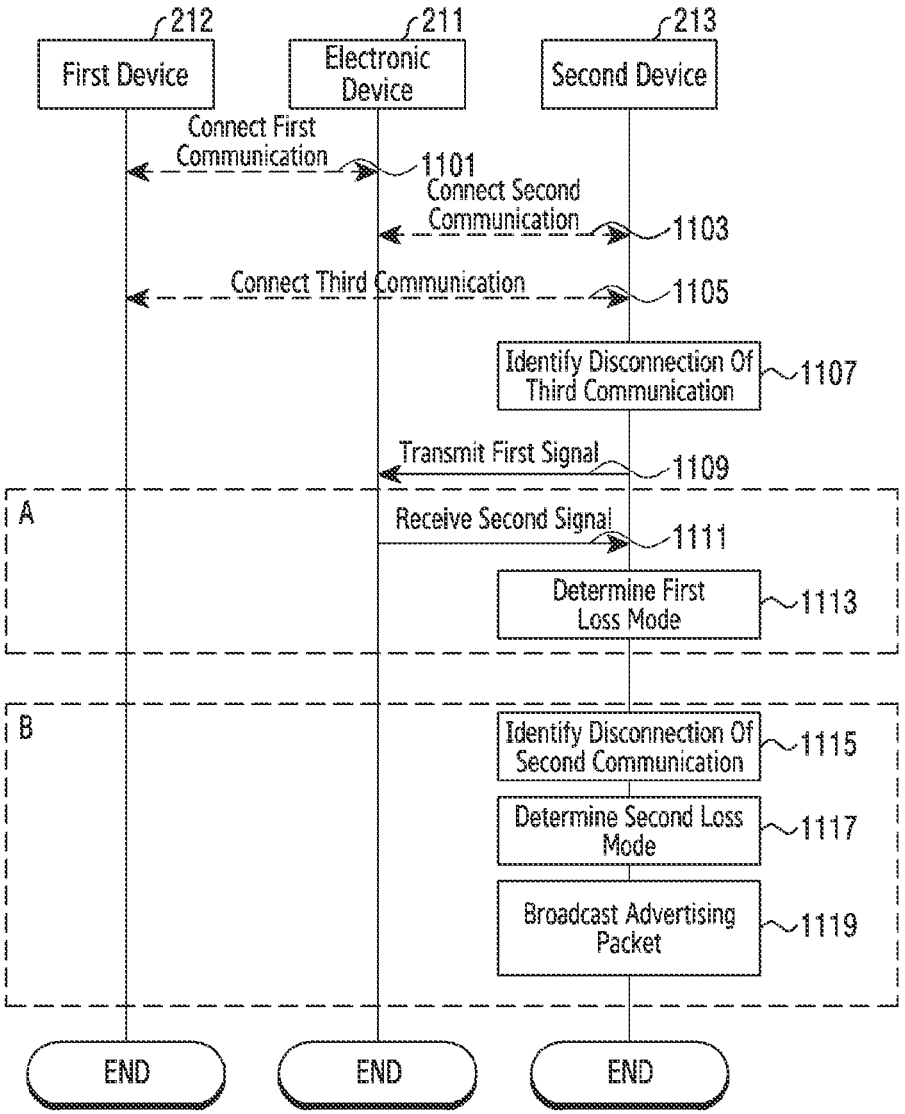
FIG. 11 illustrates a method in which the second device determines a lost state of itself, according to an embodiment.

FIG. 11 illustrates a method in which the second device 213 determines a lost state of itself, according to an embodiment. In FIG. 11, the electronic device 211, the first device 212, and the second device 213 may be understood as user devices registered using the same user account. The electronic device 211 may be a mother terminal of the first device 212 and the second device 213.

Referring to FIG. 11, first communication may be connected between the first device 212 and the electronic device 211 in step 1101. The second device 213 may connect the electronic device 211 to second communication in step 1103 and may connect the first device 212 to third communication in step 1105. The first communication, the second communication, or the third communication may be a communication scheme using a short-range wireless communication protocol, such as Bluetooth™, Wi-Fi direct, or BLE.

In step 1107, the second device 213 may determine that the third communication connected to the first device 212 has been disconnected. For example, the second device 213 may determine disconnection of the third communication through a wireless communication circuit. Although the second device 213 receives a signal from the first device 212, if a strength of the signal when received is identified to be less than or equal to a threshold reference, the third communication may be determined to be disconnected.

In step 1109, the second device 213 may transmit a first signal, which includes information on disconnection of the third communication, to the electronic device 211 via the second communication. For example, the information on disconnection of the third communication may include at least one of ID information of the first device 212, ID information of the second device 213, a cause of the disconnection, a disconnection time, a disconnection location, or configuration information prior to disconnection (e.g., a signal strength, a remaining battery level, a reconnection-related configuration value, and/or a loss detection configuration value). The second device 213 may not perform step 1109.

Operations of the second device 213 may be classified into CASE A (steps 1111 to 1113) or CASE B (steps 1115 to 1119) depending on whether the second device 213 receives a signal from the electronic device 211.

When the second device 213 receives a signal from the electronic device 211, the second device 213 may perform steps 1111 to 1113 corresponding to CASE A. In step 1111, the second device 213 may receive a second signal in response to the first signal via the second communication. For example, the second signal may include state information of the first communication. When the second signal is received from the electronic device 211, the second device 213 may determine, in step 1113, that the connection of the second communication is maintained. In this case, the second device 213 may determine that the second device 213 itself is not actually lost but is in the risk-of-loss state where the second device 213 is likely to be lost and may determine the first loss mode. The first loss mode may correspond to the risk-of-loss mode described with reference to FIG. 7. In the first loss mode, the second device 213 may configure a frequency, a time, and/or a signal strength for a reconnection attempt for the third communication to have greater values than those when normal signal transmission is performed. For example, the second device 213 may configure the signal strength for reconnection of the third communication to be at least a designated level and may perform broadcasting more than a predetermined number of times for a designated time period.

If the second device 213 fails to receive a signal from the electronic device 211, the second device 213 may perform steps 1115 to 1119 corresponding to CASE B. For example, if a signal is not received from the electronic device 211 for a predetermined period of time, the second device 213 may determine, in step 1115, that the second communication is disconnected. Although the second device 213 receives a signal from the electronic device 211, if a strength of the received signal is less than or equal to a threshold reference, the second communication may be determined to be disconnected.

In step 1117, the second device 213 may determine that the second device 213 itself is in the loss occurrence state where an actual loss has occurred, and may determine itself to be in the second loss mode corresponding to the loss occurrence mode described with reference to FIG. 7. In the second loss mode, the second device 213 may attempt to reconnect the second communication or the third communication for a predetermined number of times, and then, if reconnection fails, may immediately perform operations corresponding to the occurrence of loss. For example, in step 1119, the second device 213 may broadcast a signal for notification of its' occurrence of loss or may output an alarm signal corresponding to the occurrence of loss.

Figure 12:
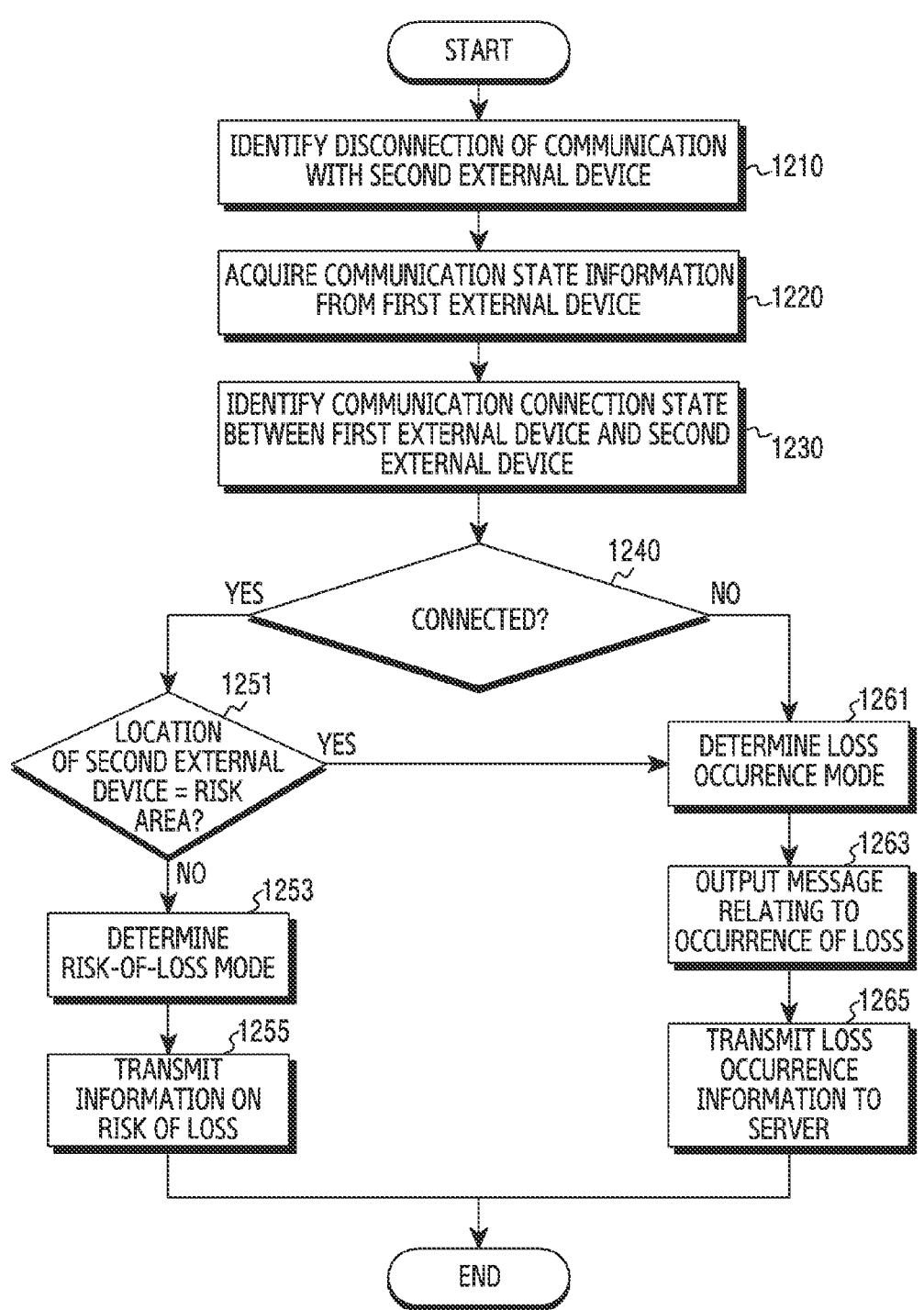
FIG. 12 illustrates an operation method of the electronic device according to an embodiment.

FIG. 12 illustrates an operation method of the electronic device 211 according to an embodiment. The electronic device 211 is a device which can be linked with multiple devices by using a short-range wireless communication connection, and may determine whether at least some of the multiple devices are lost. Operations of FIG. 12 may be performed by at least one processor (e.g., the processor 120 of FIG. 1 or the processor 620 of FIG. 6) included in the electronic device 211. The operations of FIG. 12 may be performed by the first device 212 illustrated in FIG. 2 or FIG. 5. In this case, it may be understood that the first device 212 serves as the electronic device 211 described in FIG. 12, and the electronic device 211 serves as the first device 212.

Referring to FIG. 12, in step 1210, the electronic device may determine that a communication connection between the electronic device and a second external device (e.g., the second device) is disconnected. For example, the electronic device may identify that communication with the second external device is disconnected, through a wireless communication circuit (e.g., the wireless communication module 192 of FIG. 1 or the wireless communication circuit 610 of FIG. 6). Although the electronic device receives a signal from the second external device, if a strength of the signal when received is identified to be less than or equal to a threshold reference, the communication with the second external device may be determined to be disconnected. The electronic device may transmit, to a first external device (e.g., the first device), information on the communication disconnection.

In step 1220, the electronic device may acquire, from the first external device, communication state information of the first external device. The communication state information of the first device may include information on a state of a communication connection established between the first external device and the second external device. The electronic device may acquire the communication state information from the first external device in each designated time period or when a designated event occurs (e.g., transmission of information on communication disconnection of the second external device, or occurrence of communication disconnection between the first external device and the second external device).

In step 1230, the electronic device may identify a communication connection state between the first external device and the second external device, based on the communication state information acquired from the first external device. The electronic device may determine whether the second external device is lost, based on the identified communication connection state.

If it is determined that the communication connection between the first external device and the second external device is maintained (YES in step 1240), the electronic device may determine, in step 1251, whether a location of the second external device is included in a risk area. The risk area is a crowded place with a large floating population, such as a subway station or a bus stop, and may be configured by a manufacturer or a user of the electronic device or may be received from a server (e.g., the server 300) so as to be configured. As a result of the determination, if it is determined that the second external device is not included in the risk area (NO in step 1251), the electronic device may determine, in step 1253, to operate in the risk-of-loss mode in relation to the second external device. In the risk-of-loss mode, the electronic device may determine that a probability of successful communication reconnection to the second external device is high, and may make a fervent attempt to reconnect communication between the electronic device and the second external device. In step 1253, the electronic device may configure a frequency, a time, and/or a signal strength for a reconnection request to have greater values than those when normal signal transmission is performed and transmit the reconnection request to the second external device. For example, the electronic device may transmit the reconnection request to the second external device more than a predetermined number of times for a designated time, or may configure the signal strength for the reconnection request to be greater than a designated signal strength so as to perform transmission. In step 1255, the electronic device may transmit information indicating the risk of losing the second device to the first device or the server 300. The information indicating the risk of loss may indicate that the second device is likely to be lost or indicate reconnection establishment for the second device.

As a result of the determination, if it is determined that the second external device is included in the risk area (YES in step 1251), the electronic device may determine, in step 1261, to operate in the loss occurrence mode in relation to the second external device. If it is determined, in step 1210, that the communication connection to the second external device is disconnected, the electronic device may omit steps 1220 to 1230 and perform steps 1240 to 1261.

In the case of the loss occurrence mode, in step 1263, the electronic device may output a message relating to the occurrence of losing the second external device, by using at least one output means of a display, a speaker, or a vibration generation module. In step 1265, the electronic device may transmit information on the occurrence of losing the second external device to the first external device or the server 300.

Alternatively, if it is determined that the communication connection between the first external device and the second external device is disconnected (NO in step 1240), the electronic device may determine, in step 1261, to operate in the loss occurrence mode in relation to the second external device. In the loss occurrence mode, the electronic device may determine that the probability of successful communication reconnection to the second external device is not high, and may configure the frequency, time, and/or signal strength of the reconnection request transmitted to the second device to have values less than or corresponding to those when normal signal transmission is performed. For example, the electronic device may transmit the reconnection request to the second external device for a designated or predetermined number of times, and if reconnection fails, may immediately perform operations corresponding to the occurrence of loss. In step 1263, the electronic device may output the message relating to the occurrence of losing the second external device, by using at least one output means of a display (e.g., the display module 160 of FIG. 1), a speaker (e.g., the sound output module 155 of FIG. 1), or a vibration generation module (e.g., the haptic module 179 of FIG. 1). In step 1265, the electronic device may transmit the information on the occurrence of losing the second external device to the server. The information on the occurrence of loss may include at least one of ID information of the second external device, a cause of the disconnection, a disconnection time, a disconnection location, or configuration information prior to disconnection (e.g., a signal strength and/or a remaining battery level). The server having received the information on the occurrence of loss may update information on the second external device and may transmit the information on the occurrence of loss relating to the second external device to the first external device or to other electronic devices estimated to be located in the vicinity of the second external device.

Figure 13:
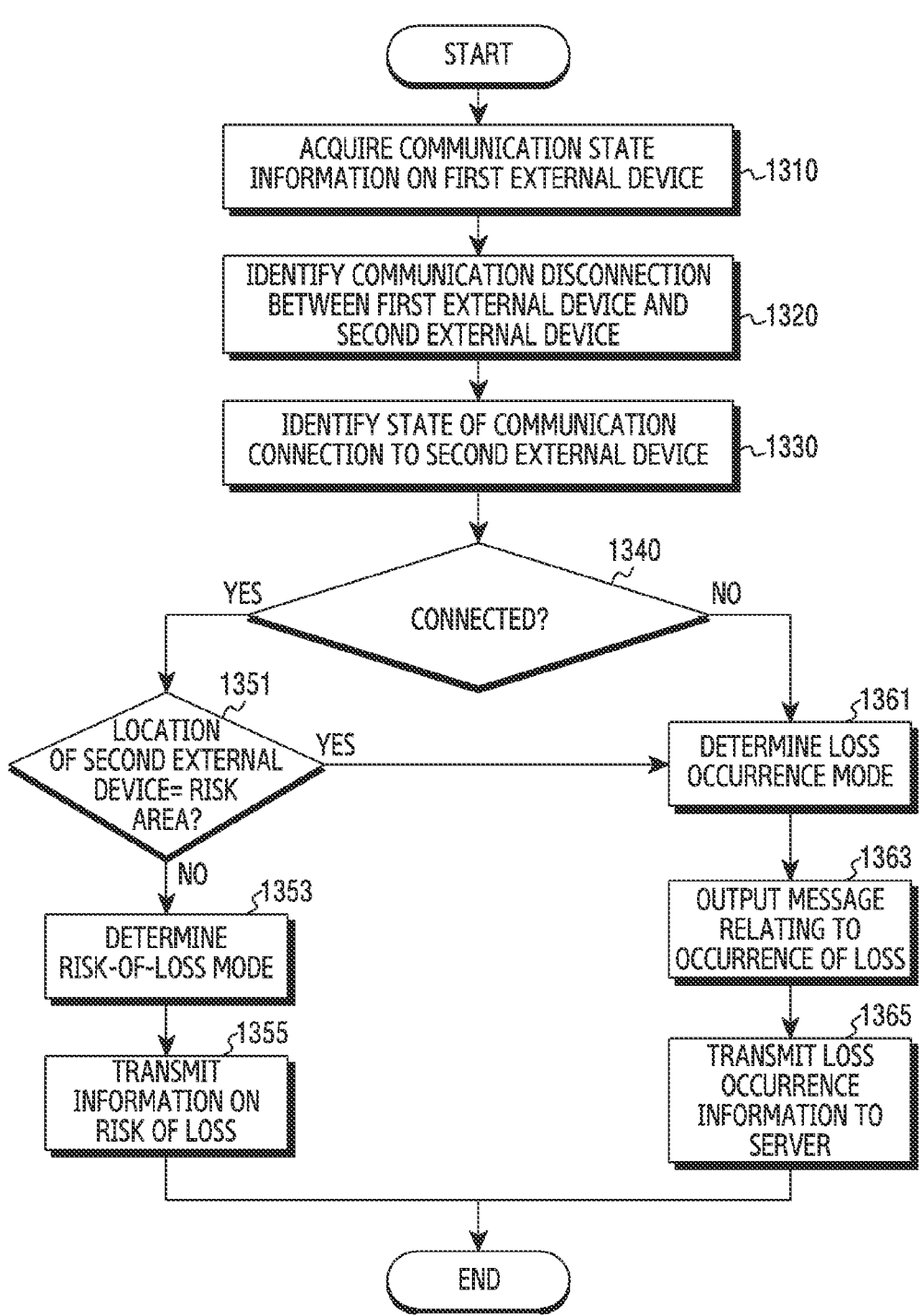
FIG. 13 illustrates an operation method of the electronic device according to an embodiment.

FIG. 13 illustrates an operation method of the electronic device 211 according to an embodiment. The electronic device is a device which can be linked with multiple devices by using a short-range wireless communication connection, and may determine whether at least some of the multiple devices are lost. Operations of FIG. 13 may be performed by at least one processor (e.g., the processor 120 of FIG. 1 or the processor 620 of FIG. 6) included in the electronic device. The operations of FIG. 13 may be performed by the first device illustrated in FIG. 2 or FIG. 5. In this case, it may be understood that the first device serves as the electronic device described in FIG. 12, and the electronic device serves as the first device.

Referring to FIG. 13, in step 1310, the electronic device may acquire, from the first external device (e.g., the first device), communication state information of the first external device. For example, the communication state information on the first external device may include information on a state of a communication connection established between the first external device and the second external device. The electronic device may acquire the communication state information from the first external device in each designated time period or when a designated event occurs (e.g., occurrence of communication disconnection between the first external device and the second external device).

In step 1320, the electronic device may identify that communication between the first external device and the second external device is disconnected, based on the communication state information acquired from the first external device. For example, the electronic device may identify that communication with the second external device is disconnected, through a wireless communication circuit (e.g., the wireless communication module 192 of FIG. 1 or the wireless communication circuit 610 of FIG. 6). Although the electronic device receives a signal from the second external device, if a strength of the signal when received is identified to be less than or equal to a threshold reference, the communication with the second external device may be determined to be disconnected.

In step 1330, the electronic device may identify a communication connection state between the electronic device and the second external device. For example, the electronic device may determine whether the communication connection to the second external device is maintained or disconnected, through a wireless communication circuit (e.g., the wireless communication module 192 of FIG. 1 or the wireless communication circuit 610 of FIG. 6). The electronic device may determine whether the second external device is lost, based on the identified communication connection state.

If it is determined that the communication connection to the second external device is maintained (YES in step 1340), the electronic device may determine, in step 1351, whether a location of the second external device is included in a risk area. The risk area is a crowded place with a large floating population, such as a subway station or a bus stop, and may be configured by a manufacturer or a user of the electronic device or may be received from a server (e.g., the server) so as to be configured. As a result of the determination, if it is determined that the second external device is not included in the risk area (NO in step 1351), the electronic device may determine, in step 1353, to operate in the risk-of-loss mode in relation to the second external device. In the risk-of-loss mode, in step 1355, the electronic device may transmit information indicating the risk of losing the second external device to the first external device. The information indicating the risk of loss may include information indicating that the second device is likely to be lost or information on establishment of reconnection to the second device. In the risk-of-loss mode, the electronic device 201 may determine that a probability of successful communication reconnection between the first electronic device 202 and the second device 203 is high, and may transmit, to the first device 202 or the second device 203, an indication relating to communication reconnection. For example, the electronic device 201 may transmit, to the first device 202 or the second device 203, a signal indicating to configure a frequency, a time, and/or a signal strength for a request for the communication reconnection to have greater values than those when normal signal transmission is performed.

As a result of the determination, if it is determined that the second external device is included in the risk area (YES in step 1351), the electronic device may determine, in step 1361, to operate in the loss occurrence mode in relation to the second external device. In the loss occurrence mode, in step 1363, the electronic device may output a message relating to the occurrence of losing the second external device, by using at least one output means of a display (e.g., the display module 160 of FIG. 1), a speaker (e.g., the sound output module 155 of FIG. 1), or a vibration generation module (e.g., the haptic module 179 of FIG. 1). In step 1365, the electronic device may transmit information on the occurrence of losing the second external device to the first external device or the server.

Alternatively, if it is determined that the communication connection to the second external device is disconnected (NO in step 1340), the electronic device may determine, in step 1361, to operate in the loss occurrence mode in relation to the second external device. In the case of the loss occurrence mode, in step 1363, the electronic device may output the message relating to the occurrence of losing the second external device. The message relating to the occurrence of loss may be provided using at least one output means of a display (e.g., the display module 160 of FIG. 1), a speaker (e.g., the sound output module 155 of FIG. 1), or a vibration generation module (e.g., the haptic module 179 of FIG. 1). In step 1365, the electronic device may transmit the information on the occurrence of losing the second external device to the server. The information on the loss occurrence state may include ID information of the second external device, a cause of the disconnection, a disconnection time, a disconnection location, or configuration information prior to disconnection (e.g., a signal strength and/or a remaining battery power). The server having received the information on the occurrence of loss may update information on the second external device and may transmit the information on the occurrence of losing the second external device to the first external device or to other electronic devices estimated to be located in the vicinity of the second external device.

In step 1310, the electronic device may acquire communication state information of the first external device from the second external device. When the communication state information is acquired from the second external device, the electronic device may determine that the communication connection to the second external device is maintained. In this case, the electronic device may perform steps 1351 to 1361 in the same manner.

Figure 14:
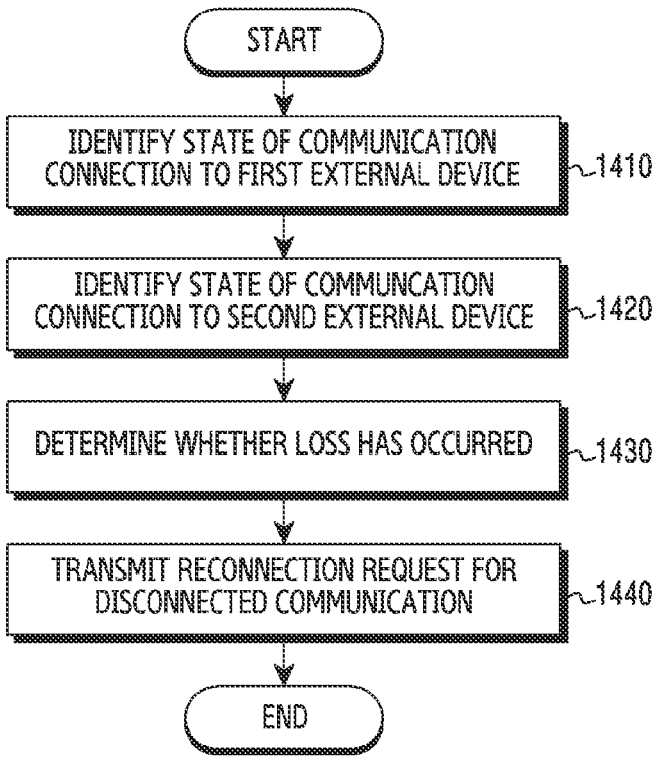
FIG. 14 illustrates an operation method of the second device according to an embodiment.

FIG. 14 illustrates an operation method of the second device according to an embodiment. The second device is a device which can be linked with a mother terminal, which is registered using the same user account, via a short-range wireless communication connection, and may correspond to the second device illustrated in FIG. 2 to FIG. 5. The method of FIG. 14 may be performed by at least one processor (e.g., the processor 120 of FIG. 1 or the processor 720 of FIG. 7) included in the second device.

Referring to FIG. 14, the second device may connect communication with external electronic devices located within a predetermined distance by using short-distance communication, such as Bluetooth™, Wi-Fi direct, or BLE.

In step 1410, the second device may identify a state of a communication connection to a first external device among at least two external electronic devices. In step 1420, the second device may identify a state of a communication connection to a second external device among the at least two external electronic devices. The first external device and the second external device are external electronic devices registered using the same user account as that for the second device, and may respectively correspond to the electronic device and the first device. Steps 1410 to 1420 may be performed in each specified time period or in response to occurrence of a designated event (e.g., communication disconnection).

In step 1430, the second device may determine whether the second device is lost, based on at least one of the states of the communication connection to the first external device and the communication connection to the second external device. For example, if it is determined that one of communication to the first external device and communication to the second external device is disconnected, the second device may determine that the second device itself is in the risk-of-loss state and may determine the risk-of-loss mode. In the risk-of-loss mode, in step 1440, the second device may configure a frequency, a time, and/or a signal strength of a reconnection request for the disconnected communication to have greater values than those when normal signal transmission is performed, and may transmit the reconnection request to the first external device or the second external device. In this case, the second device may configure the signal strength for the reconnection request to be greater than or equal to a designated level and may perform broadcasting more than a predetermined number of times for a designated time period.

If it is determined that both communication to the first external device and communication to the second external device are disconnected, the second device may determine that the second device itself is in the loss occurrence state where an actual loss has occurred and may determine the loss occurrence mode. In the loss occurrence mode, the second device may transmit, in step 1440, the reconnection request for the disconnected communication to the first external device and the second external device for the predetermined time or the predetermined number of times. If the reconnection is not successful, the second device may immediately perform operations corresponding to occurrence of loss. The second device may output an alarm signal relating to the occurrence of loss or may broadcast a signal notifying the occurrence of loss of itself (the second device).

According to an embodiment, an electronic device (e.g., the electronic device 211) may include a wireless communication circuit (e.g., the wireless communication circuit 610) configured to support communication connections to one or multiple devices, at least one processor (e.g., the processor 620) operatively connected to the wireless communication circuit, and a memory (e.g., the memory 630) operatively connected to the at least one processor, wherein the memory stores instructions causing, when executed, the at least one processor to identify whether a first communication connection to a second external device through the wireless communication circuit is disconnected, acquire, if disconnection of the first communication connection is identified, communication state information from a first external device connected through the wireless communication circuit, identify, based on the acquired communication state information, whether a second communication connection between the first external device and the second external device is disconnected, and operate in a loss occurrence mode for the second external device if disconnection of the second communication connection is identified.

The instructions may cause the at least one processor to, if it is identified that the first communication connection to the second external device is not disconnected, transmit a reconnection request to the second external device by using the wireless communication circuit.

The instructions may cause the at least one processor to configure a transmission period of the reconnection request to be less than a designated period or configure a signal strength of the reconnection request to be greater than a designated signal strength.

The electronic device may include at least one sensor, wherein the instructions cause the at least one processor to acquire location information of the second external device by using the at least one sensor, determine, based on the acquired location information, a location of the second external device if disconnection of the first communication connection is identified, and, if the determined location of the second external device is in a risk area, operate in the loss occurrence mode for the second external device without receiving the communication state information from the first external device.

The instructions may cause the at least one processor to, if it is identified that the first communication connection is not disconnected, acquire the communication state information from the first external device, and if disconnection of the second communication connection is identified based on the acquired communication state information, operate in a risk-of-loss mode for the second external device.

The instructions may cause the at least one processor to transmit information on a loss of the second external device to the first external device by using the wireless communication circuit in the loss occurrence mode for the second external device.

The instructions may cause the at least one processor to transmit information on a loss of the second external device to an external server by using the wireless communication circuit in the loss occurrence mode for the second external device.

The electronic device may include a display (e.g., the display module 160), a speaker (e.g., the audio module 170), or a vibration generation module (e.g., the haptic module 179), wherein the instructions cause the at least one processor to output a notification to notify a user that the second external device has been lost, by using at least one of the display, the speaker, or the vibration generation module in the loss occurrence mode for the second external device.

The wireless communication module may support at least one wireless communication connection of Bluetooth™, BLE, Wi-Fi, NFC, or UWB communication.

according to an embodiment, an operation method of an electronic device (e.g., the electronic device 211 may include identifying whether a first communication connection to a second external device is disconnected, acquiring, if disconnection of the first communication connection is identified, communication state information from a first external device, identifying, based on the acquired communication state information, whether a second communication connection between the first external device and the second external device is disconnected, and determining, if disconnection of the second communication connection is identified, to operate in a loss occurrence mode for the second external device.

The method may include, if it is identified that the second communication is not disconnected, transmitting a reconnection request to the second external device.

Transmitting the reconnection request to the second external device may include configuring a transmission period of the reconnection request to be less than a designated period or configuring a signal strength of the reconnection request to be greater than a designated signal strength.

The method may include acquiring location information of the second external device by using at least one sensor (e.g., the sensor module 176), determining, based on the acquired location information, a location of the second external device if disconnection of the first communication connection is identified, and, if the determined location of the second external device is in a risk area, determining to operate in the loss occurrence mode for the second external device without receiving the communication state information from the first external device.

The method may include, if it is identified that the first communication connection is not disconnected, acquiring the communication state information from the first external device, and if disconnection of the second communication connection is identified based on the acquired communication state information, determining to operate in a risk-of-loss mode for the second external device.

The method may include transmitting information on a loss of the second external device to the first external device in the loss occurrence mode for the second external device.

The method may include transmitting information on a loss of the second external device to an external server in the loss occurrence mode for the second external device.

The method further may include outputting a notification to notify a user that the second external device has been lost, by using at least one of a display (e.g., the display module 160), a speaker (e.g., the audio module 170), or a vibration generation module (e.g., the haptic module 179) in the loss occurrence mode for the second external device.

According to an embodiment, an electronic device may include a wireless communication circuit (e.g., the wireless communication circuit 710) configured to support communication connections to multiple external electronic devices, at least one processor (e.g., the processor 720) operatively connected to the wireless communication circuit, and a memory (e.g., the memory 730) operatively connected to the at least one processor, wherein the memory stores instructions causing, when executed, the at least one processor to identify a state of a communication connection to a first external device among the multiple external electronic devices, identify a state of a communication connection to a second external device among the multiple external electronic devices, and determine whether the electronic device is lost, based on at least one of the state of the communication connection to the first external device or the state of the communication connection to the second external device.

The instructions may cause the at least one processor to, if it is identified that one communication of the communication connection to the first external device or the communication connection to the second external device is disconnected, determine a risk-of-loss mode for the electronic device, and transmit, to the first external device or the second external device, a reconnection request for the disconnected communication, wherein a transmission period of the reconnection request is configured to be less than a designated period, or a signal strength of the reconnection request is configured to be greater than a designated signal strength.

The instructions may cause the at least one processor to, if it is identified that both the communication connection to the first external device and the communication connection to the second external device are disconnected, determine a loss occurrence mode for the electronic device, and transmit, to the first external device and the second external device, a reconnection request for the disconnected communication, wherein a transmission period of the reconnection request is configured to be greater than or equal to a designated period, or a signal strength of the reconnection request is configured to be less than or equal to a designated signal strength.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms such as "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device comprising:
   a wireless communication circuit configured to support communication connections to one or multiple devices;
   at least one processor; and
   memory
   storing instructions that, when executed by the at least one processor, cause the electronic device to:
   identify whether a first communication connection to a second external device through the wireless communication circuit is disconnected,
   acquire, if disconnection of the first communication connection is identified, communication state information from a first external device connected through the wireless communication circuit,
   identify, based on the acquired communication state information, whether a second communication connection between the first external device and the second external device is disconnected,
   if the second communication connection is maintained, determine to operate in a first loss mode or a second loss mode for the second external device, based on location information of the second external device identified while the first communication connection is maintained,
      when in the first loss mode, transmit information indicating a risk of connection loss for the second external device to the first external device, and
      when in the second loss mode, transmit information indicating an occurrence of connection loss for the second external device to the first external device, and
   if the second communication connection is disconnected, determine to operate in the second loss mode for the second external device and transmit the information indicating the occurrence of connection loss for the second external device to the first external device.

2. The electronic device of claim 1,
wherein the instructions, when executed by the at least one processor, further cause the electronic device to, if the second communication connection is maintained, transmit a reconnection request to the second external device by using the wireless communication circuit.

3. The electronic device of claim 2,
wherein the instructions, when executed by the at least one processor, further cause the electronic device to configure a transmission period of the reconnection request to be less than a designated period, or configure a signal strength of the reconnection request to be greater than a designated signal strength.

4. The electronic device of claim 1, wherein the electronic device further comprises at least one sensor, and
wherein the instructions, when executed by the at least one processor, further cause the electronic device to:
acquire the location information of the second external device by using the at least one sensor,
determine, if the first communication connection is disconnected, a location of the second external device, based on the acquired location information, and
determine to operate, if the determined location of the second external device is in a risk area, in the second loss mode for the second external device without receiving the communication state information from the first external device.

5. The electronic device of claim 1,
wherein the instructions, when executed by the at least one processor, further cause the electronic device to:
acquire, if the first communication connection is not disconnected, the communication state information from the first external device, and
determine to operate in the first loss mode for the second external device if disconnection of the second communication connection is identified based on the acquired communication state information.

6. The electronic device of claim 1, wherein the instructions, when executed by the at least one processor, further cause the electronic device to, if the second communication connection is disconnected, transmit information on the occurrence of connection loss for the second external device to an external server by using the wireless communication circuit in the second loss.

7. The electronic device of claim 6,
wherein the electronic device further comprises a display, a speaker, or a vibration generation module, and
wherein the instructions, when executed by the at least one processor, further cause the electronic device to output a notification to notify a user that the second external device has been lost, by using at least one of the display, the speaker, or the vibration generation module in the second loss mode for the second external device.

8. A method of an electronic device, the method comprising:
identifying whether a first communication connection to a second external device is disconnected;
if disconnection of the first communication connection is identified, acquiring communication state information from a first external device;
based on the acquired communication state information, identifying whether a second communication connection between the first external device and the second external device is disconnected;
if the second communication connection is maintained, determining to operate in a first less mode or a second loss mode for the second external device, based on location information of the second external device identified while the first communication connection is maintained,
when in the first loss mode, transmit information indicating a risk of connection loss for the second external device to the first external device; and
when in the second loss mode, transmitting information indicating an occurrence of connection loss for the second external device to the first external device, and
if the second communication connection is disconnected, determining to operate in the second loss mode for the second external device and transmitting the information indicating the occurrence of connection loss for the second external device to the first external device.

9. The method of claim 8, further comprising, if the second communication is maintained, transmitting a reconnection request to the second external device.

10. The method of claim 9,
wherein transmitting the reconnection request to the second external device comprises configuring a transmission period of the reconnection request to be less than a designated period, or configuring a signal strength of the reconnection request to be greater than a designated signal strength.

11. The method of claim 8, further comprising:
acquiring the location information of the second external device by using at least one sensor;
determining, if the first communication connection is disconnected, a location of the second external device, based on the acquired location information; and
determining, if the determined location of the second external device is in a risk area, to operate in the second loss mode for the second external device without receiving the communication state information from the first external device.

12. The method of claim 8, further comprising:
acquiring the communication state information from the first external device if the first communication connection is not disconnected; and
determining to operate in the first loss mode for the second external device if disconnection of the second communication connection is identified based on the acquired communication state information.

13. The method of claim 8, further comprising:
if the second communication connection is disconnected, transmitting information on the occurrence of connection loss for the second external device to an external server in the second loss.

14. The method of claim 8, further comprising outputting a notification to notify a user that the second external device has been lost, by using at least one of a display, a speaker, or a vibration generation module in the second loss mode for the second external device.

15. The electronic device of claim 1,
wherein the wireless communication module is configured to support at least one wireless communication connection of Bluetooth™, Bluetooth low energy (BLE), wireless-fidelity (Wi-Fi), near field communication (NFC), or ultra-wide band (UWB) communication.

16. An electronic device, comprising:

a wireless communication circuit configured to support communication connections to multiple external electronic devices;

at least one process; and memory storing instructions that, when executed by the at least one processor, cause the electronic device to:

identify a state of a communication connection to a first external device among the multiple external electronic devices, identify a state of a communication connection to a second external device among the multiple external electronic devices, and determine to operate in a first loss mode or a second loss mode, based on at least one of the state of the communication connection to the first external device or the state of the communication connection to the second external device.

17. The electronic device of claim 16, wherein the instructions, when executed by the at least one processor, further cause the electronic device to:

determine to operate in the first loss mode for the electronic device if it is identified that one of the communication connection to the first external device or the communication connection to the second external device is disconnected, and transmit a reconnection request for the disconnected communication to the first external device or the second external device, and wherein a transmission period of the reconnection request is configured to be less than a designated period, or a signal strength of the reconnection request is configured to be greater than a designated signal strength.

18. The electronic device of claim 16, wherein the instructions, when executed by the at least one processor, further cause the electronic device to:

determine to operate in the second loss mode for the electronic device if it is identified that both the communication connection to the first external device and the communication connection to the second external device are disconnected, and transmit, to the first external device and the second external device, a reconnection request for the disconnected communication, and wherein a transmission period of the reconnection request is configured to be greater than or equal to a designated period, or a signal strength of the reconnection request is configured to be less than or equal to a designated signal strength.

19. The electronic device of claim 1, wherein the instructions, when executed by the at least one processor, further cause the electronic device to, if the second communication connection is disconnected, transmit a reconnection request to the second external device by using the wireless communication circuit in a transmission period greater than a designated period, or transmit a reconnection request to the second external device by using the wireless communication circuit with a signal strength less than a designated signal strength.

20. The method of claim 8, further comprising:

if the second communication connection is disconnected, transmitting a reconnection request to the second external device in a transmission period greater than a designated period, or transmitting a reconnection request to the second external device with a signal strength less than a designated signal strength.

\* \* \* \* \*